(12) United States Patent
Kim et al.

(10) Patent No.: US 12,399,584 B2
(45) Date of Patent: Aug. 26, 2025

(54) INPUT SENSOR AND ELECTRONIC DEVICE INCLUDING THE SAME

(71) Applicant: SAMSUNG DISPLAY CO., LTD., Yongin-si (KR)

(72) Inventors: Eunyoung Kim, Yongin-si (KR); Hyeyun Han, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/360,444

(22) Filed: Jul. 27, 2023

(65) Prior Publication Data

US 2024/0118760 A1    Apr. 11, 2024

(30) Foreign Application Priority Data

Oct. 7, 2022 (KR) .................. 10-2022-0128817
Jan. 10, 2023 (KR) .................. 10-2023-0003210

(51) Int. Cl.
*G06F 3/041* (2006.01)
*G06F 3/044* (2006.01)

(52) U.S. Cl.
CPC ........ *G06F 3/0412* (2013.01); *G06F 3/04164* (2019.05); *G06F 3/0443* (2019.05); *G06F 3/0446* (2019.05); *G06F 2203/04103* (2013.01); *G06F 2203/04112* (2013.01)

(58) Field of Classification Search
CPC .. G06F 2203/04111; G06F 2203/04112; G06F 2203/04103; G06F 3/0446; G06F 3/0443; G06F 3/04164; G06F 3/0412
See application file for complete search history.

(56) References Cited

U.S. PATENT DOCUMENTS

| 11,334,207 B2 | 5/2022 | Kim et al. |
| 11,385,751 B2 | 7/2022 | Bang et al. |
| 11,442,588 B2 | 9/2022 | Hwang et al. |
| 2019/0346943 A1* | 11/2019 | Kim ............... G06F 3/0448 |

FOREIGN PATENT DOCUMENTS

| CN | 112099670 | 12/2020 |
| KR | 10-2021-0056468 | 5/2021 |
| KR | 10-2022-0016360 | 2/2022 |
| KR | 10-2491224 | 1/2023 |

* cited by examiner

*Primary Examiner* — Mariam Qureshi

(74) *Attorney, Agent, or Firm* — F. CHAU & ASSOCIATES, LLC

(57) ABSTRACT

An input sensor includes a first sensor insulating layer including an active area and a peripheral area disposed adjacent to the active area, a second sensor insulating layer disposed on the first sensor insulating layer, a first sensing electrode disposed on the first sensor insulating layer, overlapping the active area, and including first sensing patterns extending in a first direction, a second sensing electrode disposed on the first sensor insulating layer, overlapping the active area, and including second sensing patterns extending in a second direction crossing the first direction, and a first trace line connected to one of the first sensing patterns. At least a portion of the first trace line overlaps the active area and is disposed on the first sensor insulating layer.

16 Claims, 25 Drawing Sheets

INPUT SENSOR AND ELECTRONIC DEVICE INCLUDING THE SAME

CROSS-REFERENCE TO RELATED APPLICATIONS

This U.S. non-provisional patent application claims priority under 35 U.S.C. § 119 to Korean Patent Application Nos. 10-2022-0128817, filed on Oct. 7, 2022, and 10-2023-0003210, filed on Jan. 10, 2023, the disclosures of which are hereby incorporated by reference in their entireties.

TECHNICAL FIELD

Embodiments of the present disclosure relate to an input sensor and an electronic device including the same. More particularly, embodiments of the present disclosure relate to an input sensor with reduced dead space and increased sensing performance, and an electronic device including the input sensor.

DISCUSSION OF RELATED ART

Electronic devices providing images to a user, such as smartphones, digital cameras, notebook computers, navigation units, and televisions, include a display device that display the images. The display device includes a display panel generating and displaying the images and an input device such as a keyboard, a mouse, an input sensor, etc.

The input sensor is disposed on the display panel and generates an input signal when the user touches the input sensor via, for example, a touch panel. The input signal generated by the touch panel is applied to the display panel, and the display panel provides images corresponding to the input signal to the user in response to the input signal applied thereto from the touch panel.

SUMMARY

Embodiments of the present disclosure provide an electronic device with reduced dead space by reducing an area where a trace line included in an input sensor is disposed in a peripheral area.

Embodiments of the present disclosure provide an input sensor capable of preventing a trace line disposed in an active area from being viewed and a sensing performance from being deteriorated due to a parasitic capacitance and an electronic device including the input sensor.

Embodiments of the disclosure provide an input sensor including a first sensor insulating layer including an active area and a peripheral area disposed adjacent to the active area, a second sensor insulating layer disposed on the first sensor insulating layer, a first sensing electrode disposed on the first sensor insulating layer, overlapping the active area, and including a plurality of first sensing patterns extending in a first direction, a second sensing electrode disposed on the first sensor insulating layer, overlapping the active area, and including a plurality of second sensing patterns extending in a second direction crossing the first direction, and a first trace line connected to one of the first sensing patterns. At least a portion of the first trace line overlaps the active area and is disposed on the first sensor insulating layer. Each of the first sensing patterns includes a first layer electrode disposed on the first sensor insulating layer and a second layer electrode disposed on the second sensor insulating layer and electrically connected to the first layer electrode, and the second layer electrode includes a first portion overlapping the first layer electrode when viewed in a plane and a second portion overlapping the first trace line when viewed in the plane.

In an embodiment, the first sensing electrode further includes a first dummy electrode disposed on the first sensor insulating layer and electrically floated with respect to the first sensing patterns, and the second layer electrode further includes a first dummy portion overlapping the first dummy electrode when viewed in the plane.

In an embodiment, each of the first sensing patterns and the first trace line include a plurality of mesh lines, and each of the mesh lines includes a first mesh line extending in a first diagonal direction between the first direction and the second direction and a second mesh line extending from the first mesh line to a second diagonal direction crossing the first diagonal direction.

In an embodiment, the first layer electrode includes a first mesh pattern, the first portion of the second layer electrode includes a second mesh pattern, and at least a portion of the second mesh pattern overlaps the first mesh pattern when viewed in the plane.

In an embodiment, the first trace line includes a first mesh pattern, the second portion of the second layer electrode includes a second mesh pattern, and at least a portion of the second mesh pattern overlaps the first mesh pattern when viewed in the plane.

In an embodiment, a first gap is defined between the first layer electrode and the first trace line, and the second layer electrode further includes a third portion overlapping the first gap when viewed in the plane.

In an embodiment, the first portion, the second portion, and the third portion are provided integrally with each other.

In an embodiment, the second layer electrode is connected to the first trace line via at least one line contact, and the at least one line contact overlaps the active area.

In an embodiment, the second layer electrode is connected to the first layer electrode via at least one first electrode contact, and the at least one first electrode contact overlaps the active area.

In an embodiment, the second sensing electrode further includes a plurality of bridge patterns that connects the second sensing patterns, and the bridge patterns are disposed on the first sensor insulating layer.

In an embodiment, the input sensor further includes a second trace line connected to one of the second sensing patterns and overlapping the peripheral area.

In an embodiment, the first sensing electrode further includes a plurality of extension patterns that connects the first sensing patterns, and each of the extension patterns is disposed on the second sensor insulating layer and provided integrally with the second layer electrode.

In an embodiment, each of the second sensing patterns includes a first layer sub-electrode disposed on the first sensor insulating layer and a second layer sub-electrode disposed on the second sensor insulating layer and electrically connected to the first layer sub-electrode.

In an embodiment, the second sensing electrode further includes a dummy electrode disposed on the first sensor insulating layer and electrically floated with respect to the second sensing electrode, and the second layer sub-electrode further includes a dummy portion overlapping the second dummy electrode.

In an embodiment, a portion of the first trace line overlaps the second layer sub-electrode when viewed in the plane, and the second layer sub-electrode includes a first sub-portion overlapping the first layer sub-electrode when viewed in the plane and a second sub-portion overlapping the first trace line when viewed in the plane.

In an embodiment, the second layer sub-electrode is connected to the first layer sub-electrode via at least one electrode contact, and the at least one electrode contact overlaps the active area.

Embodiments of the disclosure provide an input sensor including a first sensor insulating layer including an active area and a peripheral area disposed adjacent to the active area, a second sensor insulating layer disposed on the first sensor insulating layer, a first sensing electrode disposed on the first sensor insulating layer, overlapping the active area, and including a plurality of first sensing patterns extending in a first direction, and a first trace line connected to the first sensing electrode. At least a portion of the first trace line overlaps the active area and is disposed on the first sensor insulating layer. The first sensing electrode includes a first layer electrode disposed on the first sensor insulating layer and a second layer electrode disposed on the second sensor insulating layer and electrically connected to the first layer electrode. The first layer electrode includes a first mesh pattern, a portion of the second layer electrode includes a second mesh pattern, the first trace line includes a third mesh pattern, a portion of the second layer electrode includes a fourth mesh pattern, at least a portion of the second mesh pattern overlaps the first mesh pattern when viewed in a plane, and at least a portion of the fourth mesh pattern overlaps the third mesh pattern when viewed in the plane.

Embodiments of the disclosure provide an electronic device including an input sensor including an active area and a peripheral area defined adjacent to the active area. The input sensor includes a first sensor insulating layer, a second sensor insulating layer disposed on the first sensor insulating layer, a first sensing electrode overlapping the active area and including a plurality of first sensing patterns extending in a first direction, a second sensing electrode overlapping the active area and including a plurality of second sensing patterns extending in a second direction crossing the first direction, and a first trace line connected to the first sensing electrode. At least a portion of the first trace line overlaps the active area and is disposed on the first sensor insulating layer. The first sensing electrode includes a first layer electrode disposed on the first sensor insulating layer and a second layer electrode disposed on the second sensor insulating layer and electrically connected to the first layer electrode, and the second layer electrode includes a first portion overlapping the first layer electrode when viewed in a plane and a second portion overlapping the first trace line when viewed in the plane.

In an embodiment, the electronic device further includes a display panel including a display area and a non-display area. The active area overlaps the display area, the peripheral area overlaps the non-display area, and the input sensor is disposed directly on the display panel.

In an embodiment, a first gap is defined between the first layer electrode and the first trace line, and the second layer electrode further includes a third portion overlapping the first gap when viewed in the plane.

According to embodiments of the present disclosure, at least a portion of the trace line included in the input sensor is disposed in the active area, and thus, a dead space is reduced in the electronic device. In addition, according to embodiments, the trace line is prevented from being viewed by a user, and the occurrence of parasitic capacitance is reduced by the sensing pattern with a two-layer structure. Accordingly, the sensing performance of the input sensor of the electronic device may be increased.

BRIEF DESCRIPTION OF THE DRAWINGS

The above and other features of the present disclosure will become more apparent by describing in detail embodiments thereof with reference to the accompanying drawings, in which.

DETAILED DESCRIPTION

Figure 1A:
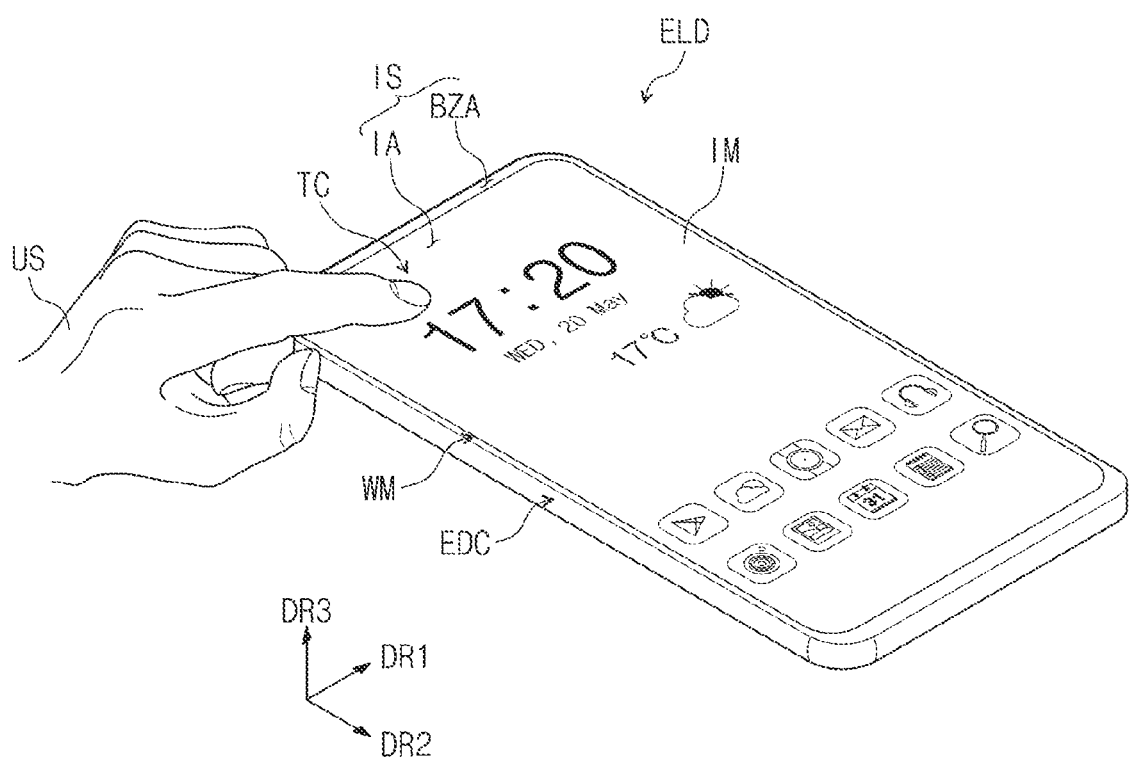
FIG. 1A is a perspective view of an electronic device according to an embodiment of the present disclosure.

Embodiments of the present disclosure will be described more fully hereinafter with reference to the accompanying drawings. Like reference numerals may refer to like elements throughout the accompanying drawings.

In the present disclosure, it will be understood that when an element (or area, layer, portion, etc.) is referred to as being "on", "connected to" or "coupled to" another element or layer, it can be directly on, connected or coupled to the other element or layer, or intervening elements or layers may be present.

As used herein, the term "and/or" may include any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the present disclosure.

As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another elements or features as shown in the figures.

It will be further understood that the terms "include" and/or "including", when used in this specification, specify the presence of stated features, integers, steps, operations, elements, and/or components, but do not preclude the presence or addition of one or more other features, integers, steps, operations, elements, components, and/or groups thereof.

In the present disclosure, when an element is referred to as being "directly connected" to another element, there are no intervening elements present between a layer, film, region, or substrate and another layer, film, region, or substrate. For example, the term "directly connected" may mean that two layers or two members are disposed without employing additional adhesive therebetween.

Figure 1B:
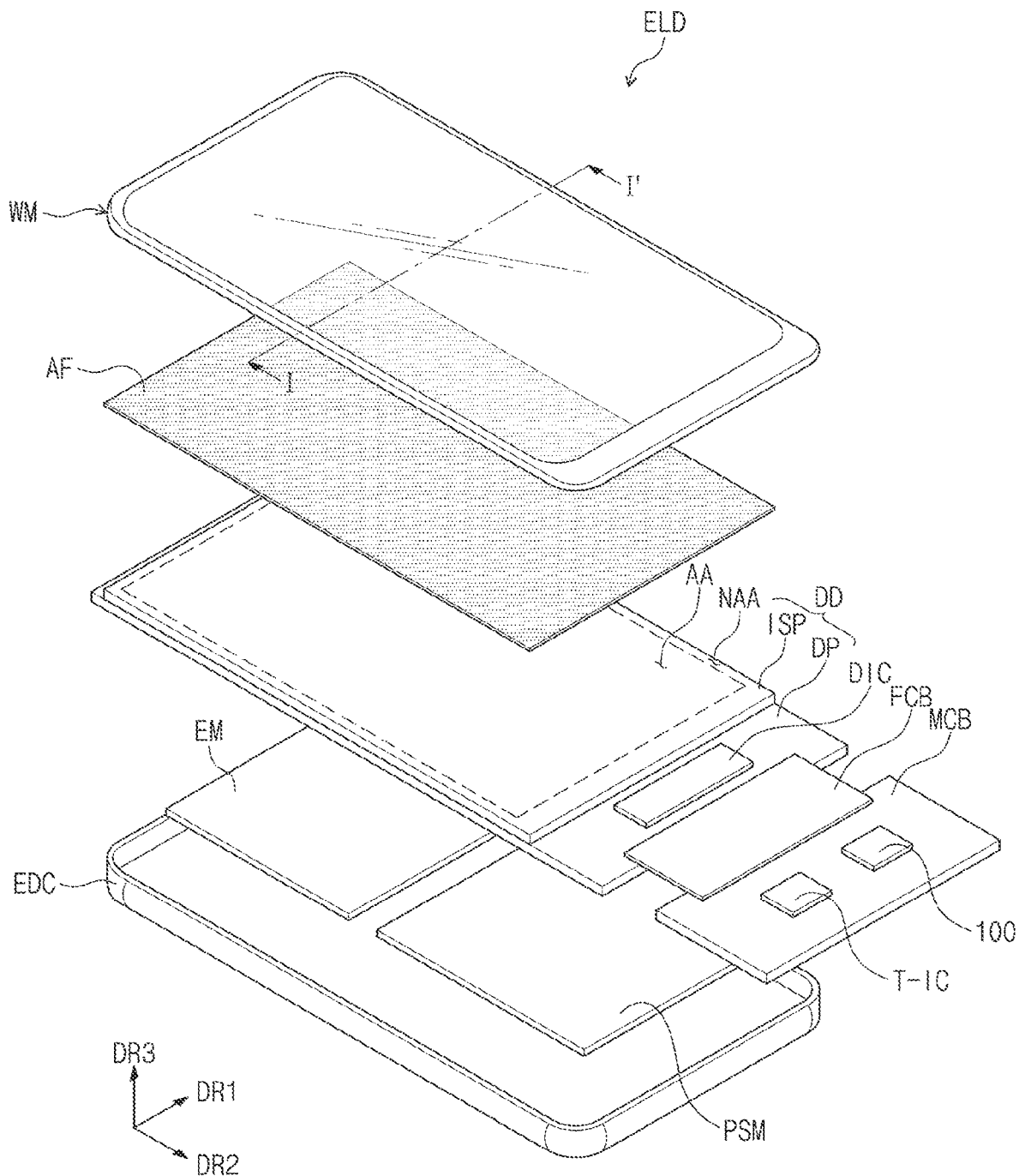
FIG. 1B is an exploded perspective view of an electronic device according to an embodiment of the present disclosure.
Figure 2A:
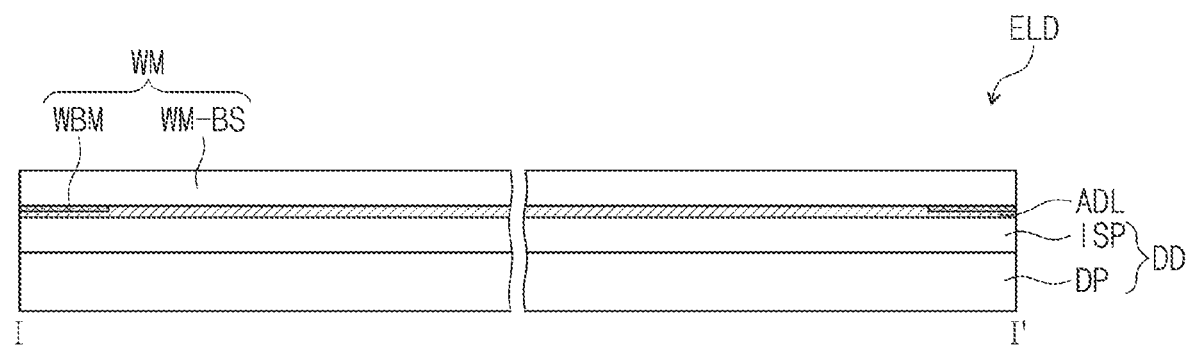
FIGS. 2A and 2B are cross-sectional views of electronic devices according to embodiments of the present disclosure.
Figure 2B:
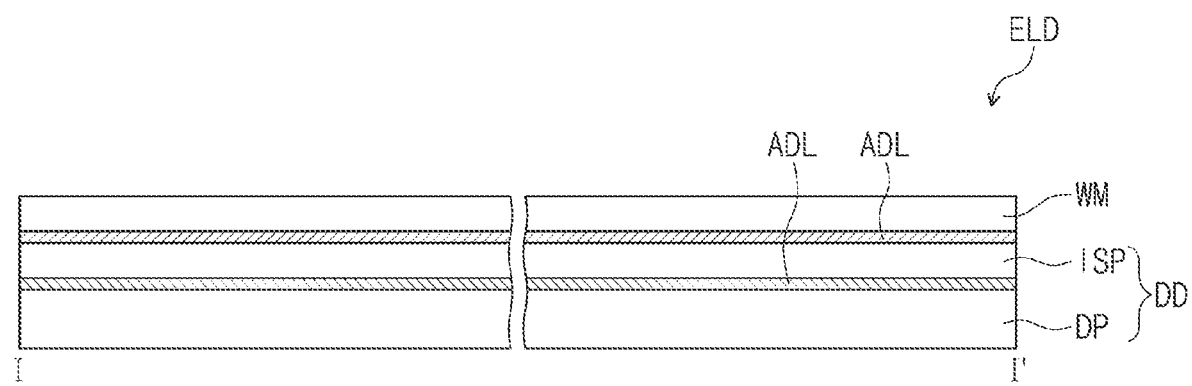
Figure 2C:
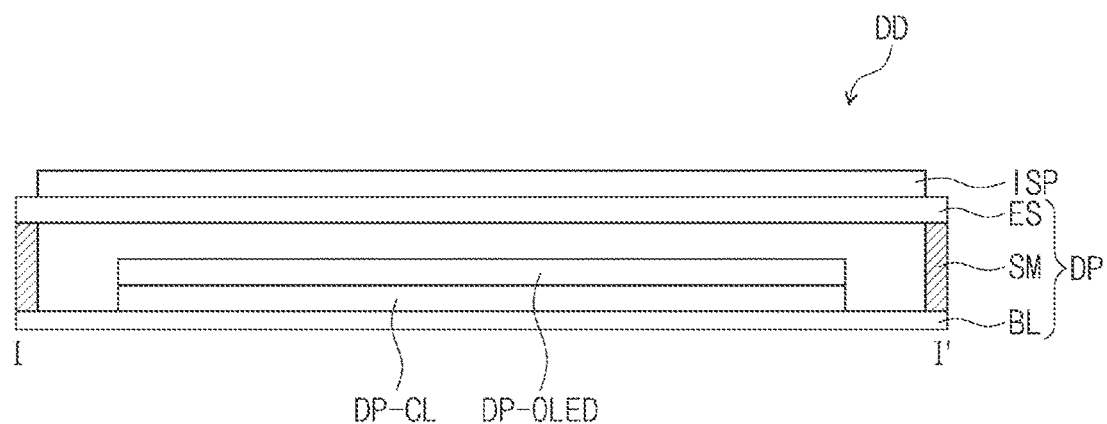
FIGS. 2C and 2D are cross-sectional views of display devices according to embodiments of the present disclosure.
Figure 2D:
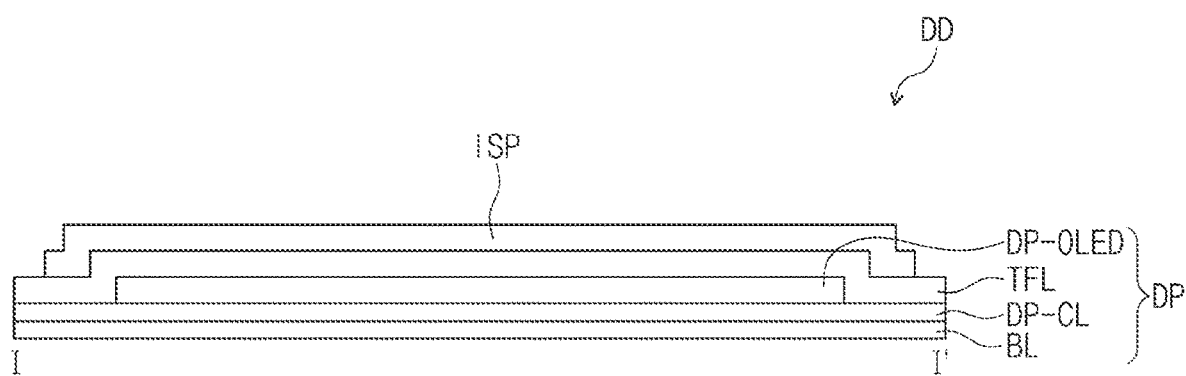

FIG. 1A is a perspective view of an electronic device ELD according to an embodiment of the present disclosure. FIG. 1B is an exploded perspective view of the electronic device ELD according to an embodiment of the present disclosure. FIGS. 2A and 2B are cross-sectional views of electronic devices ELD according to embodiments of the present disclosure. FIGS. 2A and 2B are cross-sectional views taken along a line I-I' of FIG. 1B. FIGS. 2C and 2D are cross-sectional views of display devices DD according to embodiments of the present disclosure. FIGS. 2C and 2D are cross-sectional views taken along the line I-I' of FIG. 1B.

Referring to FIGS. 1A and 1B, the electronic device ELD may be activated in response to electrical signals. The electronic device ELD may be, for example, a smartphone, a tablet computer, a notebook computer, a computer, a smart television, or the like.

The electronic device ELD may display an image IM in a third direction DR3 through a display surface IS substantially parallel to each of a first direction DR1 and a second direction DR2. The display surface IS through which the image IM is displayed may correspond to a front surface of the electronic device ELD. The image IM may include a video as well as a still image.

In an embodiment, front (or upper) and rear (or lower) surfaces of each member may be defined with respect to a direction in which the image IM is displayed. The front and rear surfaces may be opposite to each other in the third direction DR3, and a normal line direction of each of the front and rear surfaces may be substantially parallel to the third direction DR3. In the present disclosure, a direction indicated by the third direction DR3 may be referred to as an upward direction, and a direction opposite to the third direction DR3 may be referred to as a downward direction.

A separation distance between the front surface and the rear surface in the third direction DR3 may correspond to a thickness in the third direction DR3 of the electronic device ELD. Thus, the third direction DR3 may also be referred to as a thickness direction. According to embodiments, directions indicated by the first, second, and third directions DR1, DR2, and DR3 may be changed to other directions different from the directions defined in FIG. 1A.

The electronic device ELD may sense an external input applied thereto from the outside of the electronic device ELD. The external input includes various forms of inputs provided from the outside of the electronic device ELD. The electronic device ELD according to an embodiment may sense an input TC applied thereto from the outside of the electronic device ELD. The input TC may be an input generated by a passive-type input device, may be an input using a body part of a user US, and may include all inputs that cause a variation in capacitance. The electronic device ELD may sense the input TC of the user US, which is applied to a side or rear surface of the electronic device ELD depending on a structure of the electronic device ELD, and the present disclosure is not limited to a particular embodiment.

The front surface of the electronic device ELD may include an image area IA and a bezel area BZA. The image area IA may be an area through which the image IM is displayed. The user may view the image IM through the image area IA. In an embodiment, the image area IA may have a quadrangular shape with rounded vertices, however, this is merely an example. The image area IA may have a variety of shapes and is not particularly limited.

The bezel area BZA may be defined adjacent to the image area IA. The bezel area BZA may have a predetermined color. The bezel area BZA may surround the image area IA. Accordingly, the image area IA may have a shape defined by the bezel area BZA, however, this is merely an example. According to an embodiment, the bezel area BZA may be disposed adjacent to only one side of the image area IA or may be omitted. The electronic device ELD may include various embodiments and is not particularly limited.

As shown in FIG. 1B, the electronic device ELD may include a display device DD, an optical member AF, a window WM, an electronic module EM, a power module PSM, and a case EDC. The display device DD may generate an image and may sense an external input. The display device DD may include a display panel DP and an input sensor ISP. The display device DD may include an active area AA and a peripheral area NAA, which respectively correspond to the image area IA (refer to FIG. 1A) and the bezel area BZA (refer to FIG. 1A) of the electronic device ELD.

The display panel DP is not particularly limited. As an example, the display panel DP may be a light emitting type display panel such as, for example, an organic light emitting display panel or an inorganic light emitting display panel. The input sensor ISP will be described in further detail below.

The display device DD may further include a main circuit board MCB, a flexible circuit film FCB, a driving circuit DIC, a sensor control circuit T-IC, and a main controller 100. One or more of the main circuit board MCB, the flexible circuit film FCB, the driving circuit DIC, the sensor control circuit T-IC, and the main controller 100 may be omitted. Each of the driving circuit DIC, the sensor control circuit T-IC, and the main controller 100 may be provided in an integrated chip. The main circuit board MCB may be connected to the flexible circuit film FCB and may be electrically connected to the display panel DP. The main circuit board MCB may include a plurality of driving elements. The main circuit board MCB may be electrically connected to the electronic module EM via a connector.

The flexible circuit film FCB may be connected to the display panel DP to electrically connect the display panel DP to the main circuit board MCB. The display panel DP may be bent to allow the flexible circuit film FCB and the main circuit board MCB to face a rear surface of the display device DD.

FIG. 1B shows a structure in which the driving circuit DIC is mounted on the display panel DP as a representative example, however, according to an embodiment, the driving circuit DIC may be mounted on the flexible circuit film FCB. The driving circuit DIC may include driving elements such as, for example, a data driving circuit, that drives pixels of the display panel DP.

According to embodiments, the input sensor ISP may be electrically connected to the main circuit board MCB via an additional flexible circuit film, however, the present disclosure is not limited thereto. For example, the input sensor ISP may be electrically connected to the display panel DP and may be electrically connected to the main circuit board MCB via the flexible circuit film FCB.

The optical member AF may decrease a reflectance with respect to an external light. The optical member AF may include a polarizer and a retarder. The polarizer and the retarder may be a stretched type or a coating type. The stretched type optical film may have an optical axis defined along a direction in which a functional film extends. The coating type optical film may include liquid crystal molecules aligned on a base film.

According to an embodiment, the optical member AF may be omitted. In this case, the display device DD may further include a color filter and a black matrix instead of the optical member AF. The color filter and the black matrix may be disposed directly on an upper surface of the input sensor ISP through successive processes. The upper surface of the input sensor ISP may be provided by an insulating layer disposed at an uppermost position of the input sensor ISP.

The window WM may provide an exterior of the electronic device ELD. The window WM may include a base substrate and may further include functional layers, such as, for example, an anti-reflective layer, an anti-fingerprint layer, etc.

According to embodiments, the display device DD may further include at least one adhesive layer. The adhesive layer may attach adjacent components of the display device DD to each other. The adhesive layer may be, for example, an optically clear adhesive (OCA) layer, a pressure sensitive adhesive (PSA) layer, or the like.

The electronic module EM may include, for example, at least a main controller, a wireless communication module, an image input module, an audio input module, an audio output module, a memory, an external interface module, and the like. The modules may be mounted on a circuit board or may be electrically connected to each other via the flexible circuit board. The electronic module EM may be electrically connected to the power module PSM.

The main controller may control an overall operation of the electronic device ELD. For example, the main controller may activate or deactivate the display device DD in response to a user's input. The main controller may control operations of, for example, the display device DD, the wireless communication module, the image input module, the audio input module, the audio output module, and the like. The main controller may include at least one microprocessor.

The case EDC may be coupled to the window WM. The case EDC may absorb impact applied thereto from outside of the display device DD, and may prevent or reduce a foreign substance and moisture from entering the display device DD, thereby protecting components accommodated in the case EDC. According to embodiments, the case EDC may be provided in a form in which a plurality of accommodation members is combined.

Referring to FIG. 2A, the input sensor ISP may be disposed directly on the display panel DP. According to an embodiment, the input sensor ISP may be formed on the display panel DP through successive processes. For example, in an embodiment, when the input sensor ISP is disposed directly on the display panel DP, an adhesive layer is not disposed between the input sensor ISP and the display panel DP. However, as shown in FIG. 2B, in an embodiment, an adhesive layer ADL may be disposed between the input sensor ISP and the display panel DP. In this case, in an embodiment, the input sensor ISP is not formed through successive processes with the display panel DP, and may be fixed on an upper surface of the display panel DP by the adhesive layer ADL after being formed through a separate process from the display panel DP. In FIGS. 2A and 2B, for convenience of illustration, the optical member AF shown in FIG. 1B is not illustrated. In addition, for convenience of illustration, components disposed under the display device DD are not illustrated.

As shown in FIG. 2A, the window WM may include a light blocking pattern WBM that defines the bezel area BZA (refer to FIG. 1A). The light blocking pattern WBM may be a colored organic layer and may be formed on one surface of a base layer WM-BS by a coating method.

As shown in FIG. 2C, a display panel DP may include a base layer BL, a circuit element layer DP-CL disposed on the base layer BL, a display element layer DP-OLED disposed on the circuit element layer DP-CL, an encapsulation substrate ES disposed above the base layer BL, and a sealant SM that combines the base layer BL and the encapsulation substrate ES.

The base layer BL may include at least one plastic film. The base layer BL may include, for example, a plastic substrate, a glass substrate, a metal substrate, or an organic/inorganic composite substrate. In an embodiment, the base layer BL may be a thin film glass substrate having a thickness of about tens to about hundreds of micrometers. The base layer BL may have a multi-layer structure. For example, the base layer BL may include the multi-layer structure of an organic layer (e.g., a polyimide layer)/at least one inorganic layer/an organic layer (e.g., a polyimide layer).

The circuit element layer DP-CL may include at least one insulating layer and a circuit element. The insulating layer may include at least one inorganic layer and at least one organic layer. The circuit element may include signal lines and a pixel circuit. This will be described in further detail below.

The display element layer DP-OLED may include at least a light emitting element. The display element layer DP-OLED may further include an organic layer such as a pixel definition layer.

The encapsulation substrate ES may be spaced apart from the display element layer DP-OLED with a predetermined gap therebetween. The base layer BL and the encapsulation substrate ES may include, for example, a plastic substrate, a glass substrate, a metal substrate, or an organic/inorganic composite substrate. The sealant SM may include an organic adhesive or a frit. The gap GP may be filled with a predetermined material. A desiccant or resin material may be filled in the gap.

As shown in FIG. 2D, a display panel DP may include, for example, a base layer BL, a circuit element layer DP-CL disposed on the base layer BL, a display element layer DP-OLED disposed on the circuit element layer DP-CL, and an upper insulating layer TFL disposed on the display element layer DP-OLED and the circuit element layer DP-CL. The upper insulating layer TFL may include a plurality of thin layers. The upper insulating layer TFL may include a protective layer that protects a light emitting element. The upper insulating layer TFL may include a thin film encapsulation layer including at least an inorganic layer/organic layer/inorganic layer. The thin film encapsulation layer may be disposed on a protective layer.

Figure 3:
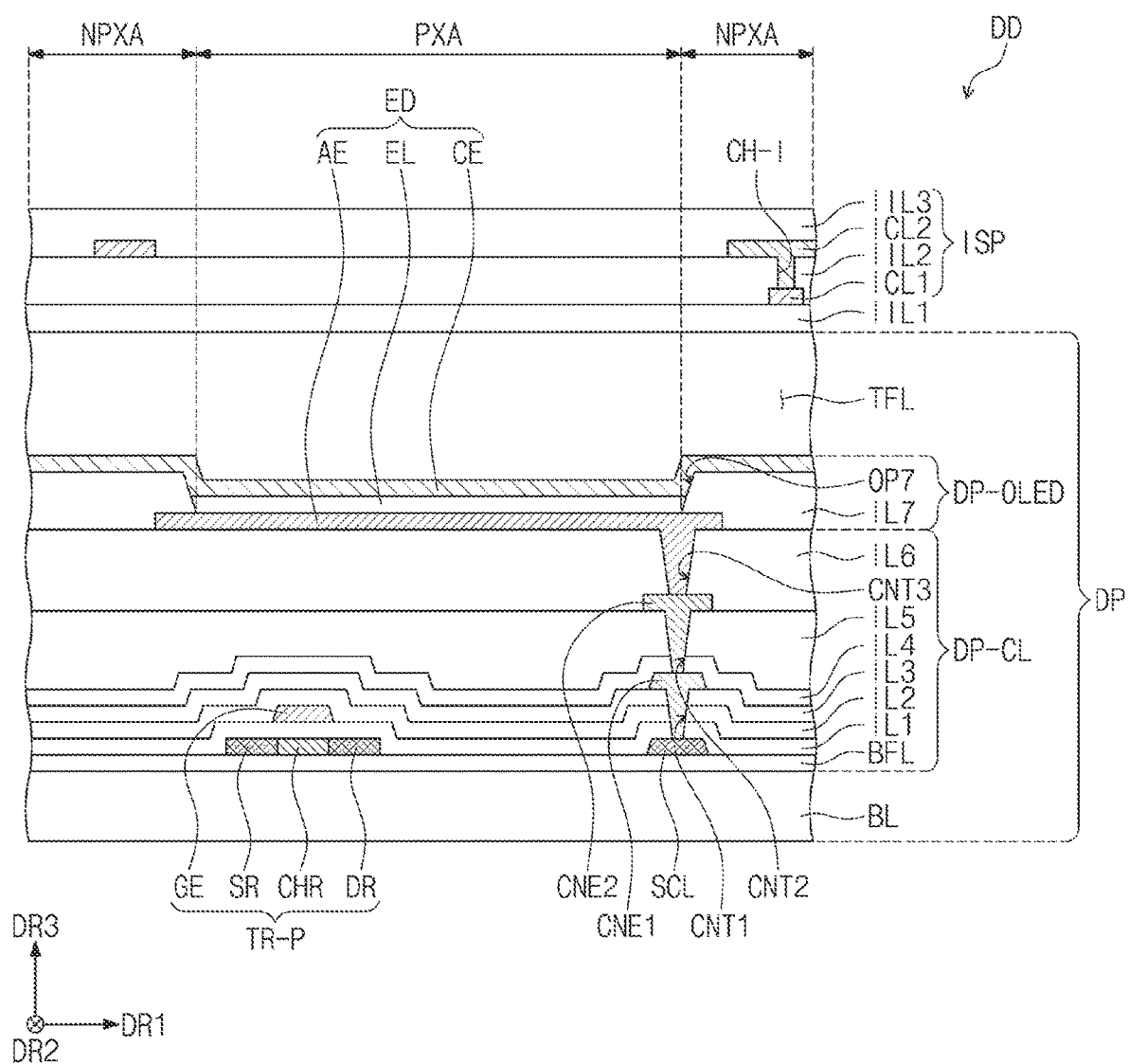
FIG. 3 is an enlarged cross-sectional view of a display device according to an embodiment of the present disclosure.

FIG. 3 is an enlarged cross-sectional view of the display device DD according to an embodiment of the present disclosure. FIG. 3 shows the display device DD corresponding to the display device DD of FIG. 2D.

Referring to FIG. 3, the display device DD may include the display panel DP and the input sensor ISP disposed directly on the display panel DP. The display panel DP may include the base layer BL, the circuit element layer DP-CL, the display element layer DP-OLED, and the upper insulating layer TFL. The display panel DP may be disposed directly on the upper insulating layer TFL.

The display device DD may include the active area AA and the peripheral area NAA described with reference to FIG. 1B, and each of the display panel DP and the input sensor ISP may include areas respectively corresponding to the active area AA and the peripheral area NAA of the display device DD. FIG. 3 is an enlarged view of a portion of the active area AA.

The base layer BL may provide a base surface on which the circuit element layer DP-CL is disposed. The circuit element layer DP-CL may be disposed on the base layer BL. The circuit element layer DP-CL may include, for example, an insulating layer, a semiconductor pattern, a conductive pattern, and a signal line. An insulating layer, a semiconductor layer, and a conductive layer may be formed on the base layer BL by a coating or depositing process. Then, the insulating layer, the semiconductor layer, and the conductive layer may be selectively patterned through several photolithography processes. The semiconductor pattern, the conductive pattern, and the signal line included in the circuit element layer DP-CL may be formed.

At least one inorganic layer may be formed on an upper surface of the base layer BL. In an embodiment, the display panel DP may include a buffer layer BFL. The buffer layer BFL may increase an adhesion between the base layer BL and the semiconductor pattern. The buffer layer BFL may include, for example, a silicon oxide layer and a silicon nitride layer, and the silicon oxide layer and the silicon nitride layer may be alternately stacked with each other.

The semiconductor pattern may be disposed on the buffer layer BFL. The semiconductor pattern may include polysilicon, however, the semiconductor pattern is not limited thereto. According to an embodiment, the semiconductor pattern may include amorphous silicon or metal oxide.

For convenience of illustration, FIG. 3 shows only a portion of the semiconductor pattern, and it is to be understood that the semiconductor pattern may be further disposed in other areas. The semiconductor pattern may be arranged with a specific rule over the pixels. The semiconductor pattern may have different electrical properties depending on whether the semiconductor pattern is doped or not, or whether the semiconductor pattern is doped with an N-type dopant or a P-type dopant. The semiconductor pattern may include a first region having high conductivity and a second region having low conductivity. The first region may be doped with the N-type dopant or the P-type dopant. A P-type transistor may include a doped region doped with the P-type dopant. The second region may be a non-doped region or may be doped at a low concentration compared with the first region.

The first region may have the conductivity greater than that of the second region and may substantially serve as an electrode or signal line. The second region may substantially correspond to an active area (or a channel area) of a pixel transistor TR-P. In other words, a portion of the semiconductor pattern may be the active area of the pixel transistor TR-P, and other portions of the semiconductor pattern may be a source area or a drain area of the pixel transistor TR-P.

Each of the pixels may have an equivalent circuit that includes seven transistors, one capacitor, and a light emitting element, and the equivalent circuit of the pixel may be changed in various ways. FIG. 3 shows one pixel transistor TR-P and the light emitting element ED included in the pixel.

A source area SR, a channel area CHR, and a drain area DR of the pixel transistor TR-P may be formed from the semiconductor pattern. The source area SR and the drain area DR may extend in opposite directions to each other from the channel area CHR in a cross-section. FIG. 3 shows a portion of a signal transmission area SCL formed as the first region of the semiconductor pattern. According to embodiments, the signal transmission area SCL may be electrically connected to the pixel transistor TR-P when viewed in a plane.

A first insulating layer IL1 may be disposed on the buffer layer BFL. The first insulating layer IL1 may commonly overlap the pixels and may cover the semiconductor pattern. The first insulating layer IL1 may be an inorganic layer and/or an organic layer and may have a single-layer or multi-layer structure. The first insulating layer IL1 may include, for example, at least one of aluminum oxide, titanium oxide, silicon oxide, silicon nitride, silicon oxynitride, zirconium oxide, and hafnium oxide. In an embodiment, the first insulating layer IL1 may have a single-layer structure of a silicon oxide layer. Not only the first insulating layer IL1, but also an insulating layer of the circuit element layer DP-CL described below may be an inorganic layer and/or an organic layer and may have a single-layer or multi-layer structure. The inorganic layer may include at least one of the above-mentioned materials, however, it the inorganic layer is not limited thereto.

A gate GE of the pixel transistor TR-P may be disposed on the first insulating layer IL1. The gate GE may be a portion of a metal pattern. The gate GE may overlap the channel area CHR. The gate GE may be used as a mask in a process of doping the semiconductor pattern.

A second insulating layer IL2 may be disposed on the first insulating layer IL1 and may cover the gate GE. The second insulating layer IL2 may commonly overlap the pixels. The second insulating layer IL2 may be an inorganic layer and/or an organic layer and may have a single-layer or multi-layer structure. In an embodiment, the second insulating layer IL2 may have a single-layer structure of a silicon oxide layer.

A third insulating layer IL3 may be disposed on the second insulating layer IL2. In an embodiment, the third insulating layer IL3 may have a single-layer structure of a silicon oxide layer. A first connection electrode CNE1 may be disposed on the third insulating layer IL3. The first connection electrode CNE1 may be connected to the signal transmission area SCL through a contact hole CNT1 defined through the first, second, and third insulating layers IL1, IL2, and IL3.

A fourth insulating layer IL4 may be disposed on the third insulating layer IL3. The fourth insulating layer IL4 may have a single-layer structure of a silicon oxide layer. A fifth insulating layer IL5 may be disposed on the fourth insulating layer IL4. The fifth insulating layer IL5 may be an organic layer. According to embodiments, the fourth insulating layer IL4 may be omitted, and the fifth insulating layer IL5 may be disposed on the third insulating layer IL3.

A second connection electrode CNE2 may be disposed on the fifth insulating layer IL5. The second connection electrode CNE2 may be connected to the first connection electrode CNE1 through a contact hole CNT2 defined through the fourth insulating layer IL4 and the fifth insulating layer IL5.

A sixth insulating layer IL6 may be disposed on the fifth insulating layer IL5 and may cover the second connection electrode CNE2. The sixth insulating layer IL6 may be an organic layer. The display element layer DP-OLED may be disposed on the circuit element layer DP-CL. The display element layer DP-OLED may include the light emitting element ED. The light emitting element ED may include a first electrode AE, a light emitting layer EL, and a second electrode CE. For example, the light emitting layer EL may include an organic light emitting material, a quantum dot, a quantum rod, a micro-LED, or a nano-LED.

The first electrode AE may be disposed on the sixth insulating layer IL6. The first electrode AE may be connected to the second connection electrode CNE2 through a contact hole CNT3 defined through the sixth insulating layer IL6.

A pixel definition layer IL7 may be disposed on the sixth insulating layer IL6 and may cover a portion of the first electrode AE. An opening OP7 may be defined through the pixel definition layer IL7. At least a portion of the first electrode AE may be exposed through the opening OP7 of the pixel definition layer IL7. In an embodiment, a light emitting area PXA may be defined to correspond to the portion of the first electrode AE exposed through the opening OP7. A non-light-emitting area NPXA may surround the light emitting area PXA The light emitting layer EL may be disposed on the first electrode AE. The light emitting layer EL may be disposed to correspond to the opening OP7. That is, the light emitting layer EL may be formed in each of the pixels after being divided into a plurality of portions. When the light emitting layer EL is formed in each of the pixels after being divided into a plurality of portions, each of the light emitting layers EL may emit a light having at least one of blue, red, and green colors, however, the light emitting layers EL are not limited thereto. The light emitting layer EL may be commonly provided over the pixels. In this case, the light emitting layer EL may provide a blue light or a white light.

The second electrode CE may be disposed on the light emitting layer EL. The second electrode CE may have a single unitary form and may be commonly disposed over the pixels. A common voltage may be applied to the second electrode CE, and the second electrode CE may be referred to as a common electrode.

According to embodiments, a hole control layer may be disposed between the first electrode AE and the light emitting layer EL. The hole control layer may be commonly disposed in the light emitting area PXA and the non-light-emitting area NPXA. The hole control layer may include a hole transport layer and may further include a hole injection layer. An electron control layer may be disposed between the light emitting layer EL and the second electrode CE. The electron control layer may include an electron transport layer and may further include an electron injection layer. The hole control layer and the electron control layer may be commonly formed in the plurality of pixels using an open mask.

The input sensor ISP may be directly formed on an upper surface of the upper insulating layer TFL through successive processes. The input sensor ISP may include a first sensor insulating layer IIL1, a first sensor conductive layer ICL1, a second sensor insulating layer IIL2, a second sensor conductive layer ICL2, and a third sensor insulating layer IIL3. The second sensor conductive layer ICL2 may extend through a channel CH-I formed in the second sensor insulating layer IILI2 to connect to the first sensor conductive layer ICL1. In the present disclosure, the first sensor insulating layer IIL1 may be referred to as a base insulating layer.

Each of the first and second sensor conductive layers ICL1 and ICL2 may have a single-layer structure or a plurality of patterns having a multi-layer structure of layers stacked in the third direction DR3. The conductive layer having the single-layer structure may include a metal layer or a transparent conductive layer. The metal layer may include, for example, molybdenum, silver, titanium, copper, aluminum, or alloys thereof. The transparent conductive layer may include a transparent conductive oxide, such as, for example, indium tin oxide (ITO), indium zinc oxide (IZO), zinc oxide (ZnO), indium zinc tin oxide (ITZO), or the like. In addition, the transparent conductive layer may include conductive polymer such as, for example, PEDOT, metal nanowire, graphene, or the like.

The conductive layer having the multi-layer structure may include metal layers. The metal layers may have a three-layer structure of titanium/aluminum/titanium. The conductive layer having the multi-layer structure may include at least one metal layer and at least one transparent conductive layer.

The second sensor insulating layer IIL2 may cover the first sensor conductive layer ICL1, and the third sensor insulating layer IIL3 may cover the second sensor conductive layer ICL2. In an embodiment, each of the first, second, and third sensor insulating layers IIL1, IIL2, and IIL3 has the single-layer structure, however, the present disclosure is not limited thereto.

At least one of the first sensor insulating layer IIL1 and the second sensor insulating layer IIL2 may include an inorganic layer. The inorganic layer may include at least one of, for example, aluminum oxide, titanium oxide, silicon oxide, silicon nitride, silicon oxynitride, zirconium oxide, and hafnium oxide.

At least one of the second sensor insulating layer IIL2 and the third sensor insulating layer IIL3 may include an organic layer. The organic layer may include at least one of, for example, an acrylic-based resin, a methacrylic-based resin, a polyisoprene-based resin, a vinyl-based resin, an epoxy-based resin, a urethane-based resin, a cellulose-based resin, a siloxane-based resin, a polyimide-based resin, a polyamide-based resin, and a perylene-based resin.

Figure 4A:
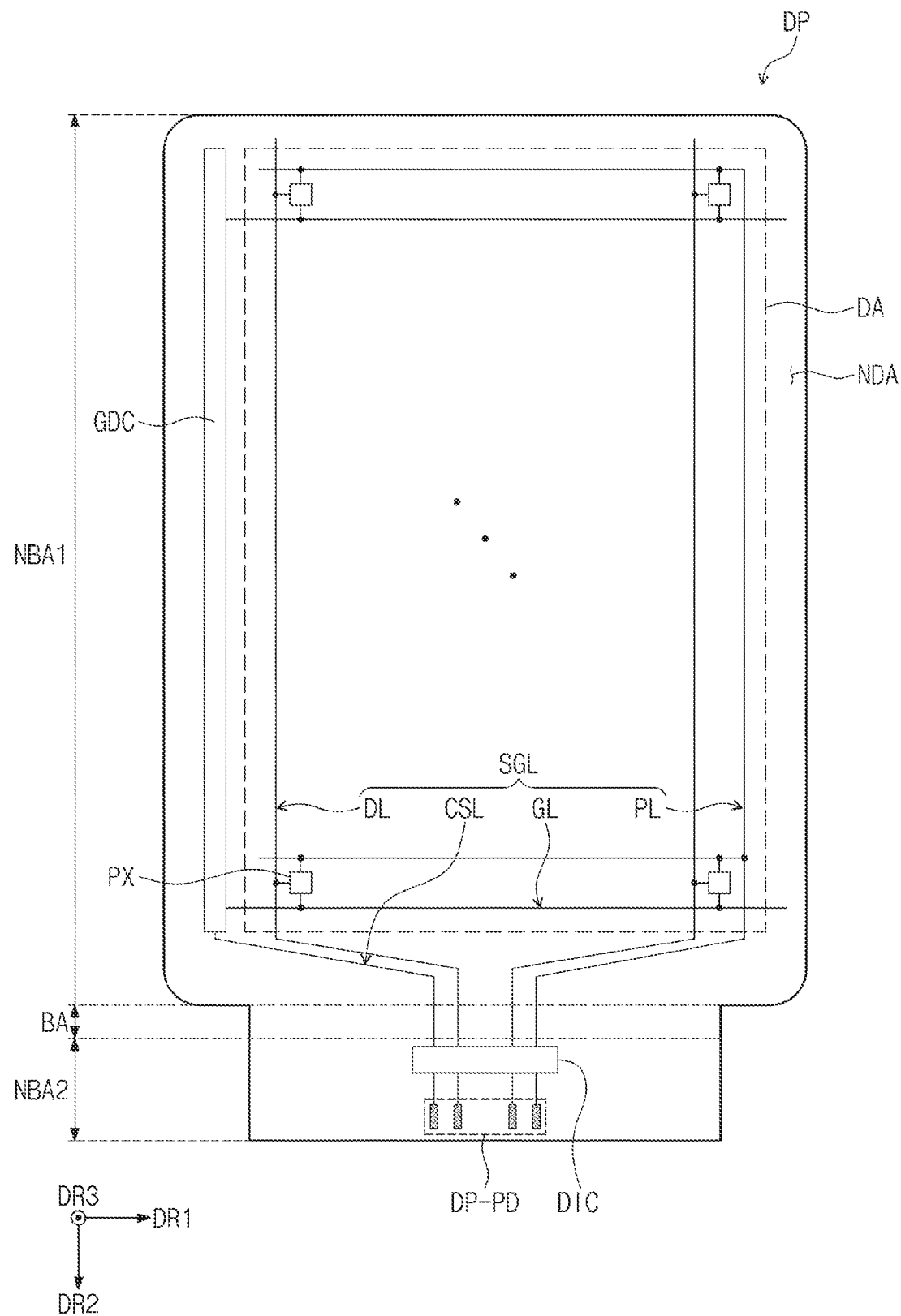
FIG. 4A is a plan view of a display panel according to an embodiment of the present disclosure.
Figure 4B:
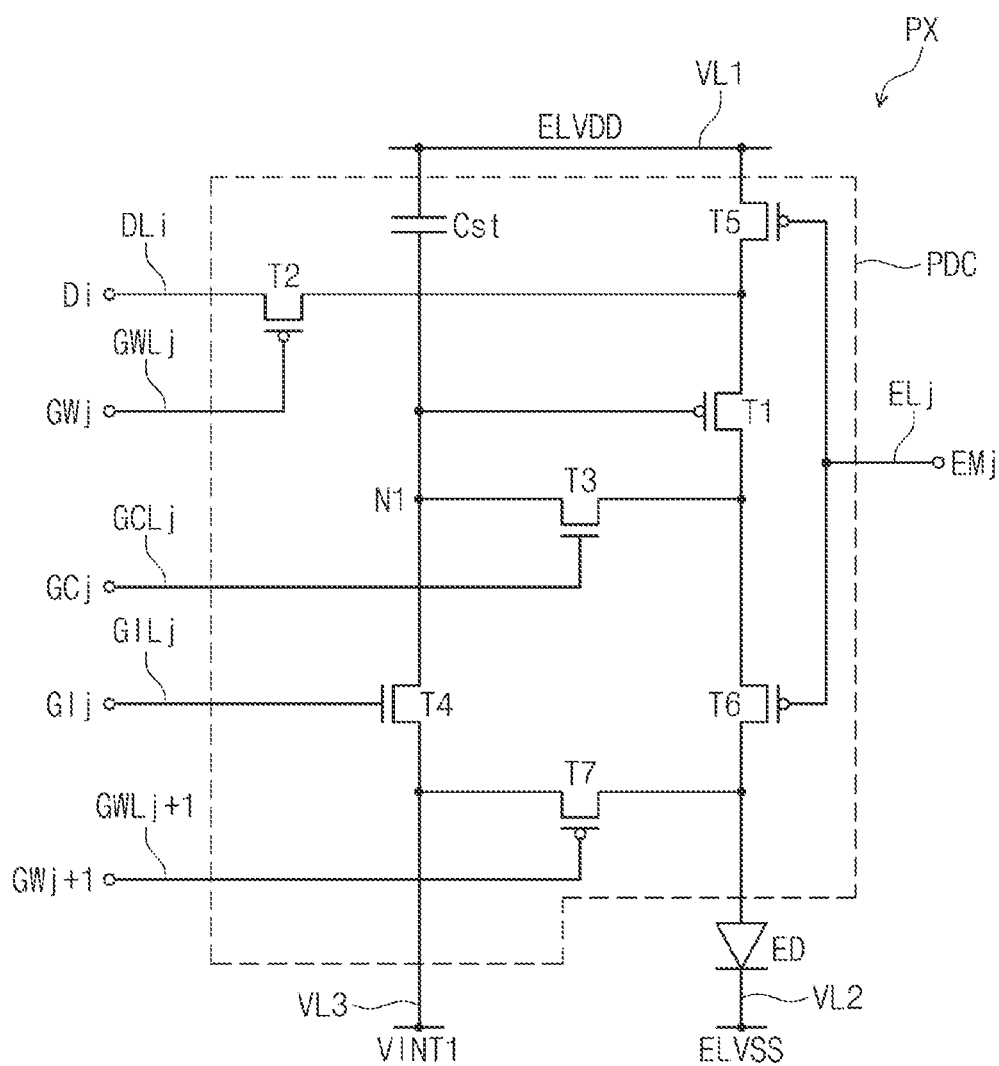
FIG. 4B is a circuit diagram of a pixel according to an embodiment of the present disclosure.

FIG. 4A is a plan view of the display panel DP according to an embodiment of the present disclosure, and FIG. 4B is a circuit diagram of a pixel PX among a plurality of pixels PX according to an embodiment of the present disclosure.

Referring to FIG. 4A, the display panel DP may include a display area DA and a non-display area NDA when viewed in a plane. The display area DA of the display panel DP may be an area in which an image is displayed, and the non-display area NDA of the display panel DP may be an area in which a driving circuit or a driving line is disposed and in which an image is not displayed. The light emitting elements of the pixels PX may be arranged in the display area DA. The display area DA may overlap at least a portion of the image area IA (refer to FIG. 1A) of the electronic device ELD (refer to FIG. 1A), and the non-display area NDA may be covered by the bezel area BZA (refer to FIG. 1A) of the electronic device ELD (refer to FIG. 1A). The display area DA and the non-display area NDA of the display panel DP may correspond to the active area AA and the peripheral area NAA of the display device DD shown in FIG. 1B, respectively.

According to an embodiment, the display panel DP may include the pixels PX, a plurality of signal lines SGL, a scan driving circuit GDC, the driving circuit DIC, and a display pad part DP-PD.

Each of the pixels PX may include the light emitting element and a plurality of transistors connected to the light emitting element. The pixels PX may emit a light in response to an electrical signal applied thereto.

The signal lines SGL may include scan lines GL, data lines DL, a power line PL, and a control signal line CSL. Each of the scan lines GL may be connected to corresponding pixels among the pixels PX. Each of the data lines DL may be connected to corresponding pixels among the pixels PX. The power line PL may be connected to the pixels PX and may provide a power source voltage to the pixels PX. The control signal line CSL may apply control signals to the scan driving circuit.

The scan driving circuit GDC may be disposed in the non-display area NDA. The scan driving circuit GDC may generate scan signals and may sequentially output the scan signals to the scan lines GL. The scan driving circuit GDC may further output another control signal to the driving circuit of the pixels PX.

The scan driving circuit GDC may include a plurality of thin film transistors formed through the same process as the driving circuit of the pixels PX, for example, a low temperature polycrystalline silicon (LTPS) process or a low temperature polycrystalline oxide (LTPO) process.

According to an embodiment, a portion of the display panel DP may be bent. The display panel DP may include a first non-bending area NBA1, a second non-bending area NBA2 spaced apart from the first non-bending area NBA1 in the second direction DR2, and a bending area BA defined between the first non-bending area NBA1 and the second non-bending area NBA2. The first non-bending area NBA1 may include the display area DA and a portion of the non-display area NDA. The non-display area NDA may include the bending area BA and the second non-bending area NBA2.

The bending area BA may be bent with respect to an imaginary axis extending in the first direction DR1. When the bending area BA is bent, the second non-bending area NBA2 may be disposed to face the first non-bending area NBA1. According to embodiments, a width in the first direction DR1 of the display panel DP may be smaller in the first non-bending area NBA1 than in the bending area BA.

The display pad part DP-PD may be disposed adjacent to an edge of the second non-bending area NBA2. The signal lines SGL may extend from the first non-bending area NBA1 to the second non-bending area NBA2 via the bending area BA and may be connected to the display pad part DP-PD. The display pad part DP-PD may be electrically connected to the flexible circuit film FCB (refer to FIG. 1B). As the flexible circuit film FCB (refer to FIG. 1B) is attached to the display pad part DP-PD by a conductive adhesive film, the display panel DP may be electrically connected to the flexible circuit film FCB (refer to FIG. 1B). According to embodiments, the driving circuit DIC may be mounted on the display panel DP and may include the data driving circuit.

FIG. 4B shows an equivalent circuit diagram of one pixel among the pixels PX shown in FIG. 4A. The pixels PX may have substantially the same circuit configuration as each other. For example, each of the pixels PX may have substantially the same circuit configuration as the pixel PX shown in FIG. 4B.

Referring to FIG. 4B, the pixel PX may be connected to an i-th data line DLi among data lines DL, a j-th initialization scan line GILj among initialization scan lines, a j-th compensation scan line GCLj among compensation scan lines, a j-th write scan line GWLj among write scan lines, a (j+1)th write scan line GWLj+1 among the write scan lines, and a j-th light emission control line ELj among light emission control lines.

The pixel PX may include the light emitting element ED and a pixel driving circuit PDC. The light emitting element ED may be a light emitting diode. As an example, the light emitting element ED may be an organic light emitting diode including an organic light emitting layer.

The pixel driving circuit PDC may include first, second, third, fourth, fifth, sixth, and seventh transistors T1, T2, T3, T4, T5, T6, and T7, and one storage capacitor Cst. The first, second, third, fourth, fifth, sixth, and seventh transistors T1, T2, T3, T4, T5, T6, and T7 may be referred to as a driving thin film transistor T1, a switching thin film transistor T2, a compensation thin film transistor T3, a first initialization thin film transistor T4, an operation control thin film transistor T5, a light emission control thin film transistor T6, and a second initialization thin film transistor T7, respectively.

Some of the first to seventh transistors T1 to T7 may be a P-type transistor, and others of the first to seventh transistors T1 to T7 may be an N-type transistor. As an example, each of the first, second, fifth, sixth, and seventh transistors T1, T2, T5, T6, and T7 may be a PMOS transistor, and each of the third and fourth transistors T3 and T4 may be an NMOS transistor.

At least one of the first to seventh transistors T1 to T7 may include a low-temperature polycrystalline silicon (LTPS) semiconductor layer. At least one of the first to seventh transistors T1 to T7 may include an oxide semiconductor layer.

For example, the first transistor T1, which directly affects a luminance of the display device, may include the semiconductor layer containing polycrystalline silicon with high reliability, and thus, the display device with high resolution may be implemented.

According to embodiments, since the oxide semiconductor has a high carrier mobility and a low leakage current, a voltage drop is not large even though a driving time becomes long. That is, even when the pixels PX are driven at low frequency, a change in color of the image due to the voltage drop is not large, and thus, the pixels PX may be driven at low frequency. As described above, since the oxide semiconductor has low leakage current, at least one of the third transistor T3 and the fourth transistor T4, which are connected to a driving gate electrode of the first transistor T1, may include the oxide semiconductor. Thus, the leakage current may be prevented from flowing to the driving gate electrode of the first transistor T1, and power consumption may be reduced.

Each of the first, second, fifth, sixth, and seventh transistors T1, T2, T5, T6, and T7 may be a transistor including the low-temperature polycrystalline silicon semiconductor layer, and each of the third and fourth transistors T3 and T4 may be a transistor including the oxide semiconductor transistor.

The configuration of the pixel driving circuit PDC is not limited to that the configuration shown in FIG. 4B. The pixel driving circuit PDC shown in FIG. 4B is merely an example, and the configuration of the pixel driving circuit PDC may be changed. As an example, in an embodiment, all of the first to seventh transistors T1 to T7 may be the P-type transistor or the N-type transistor.

The j-th initialization scan line GILj, the j-th compensation scan line GCLj, the j-th write scan line GWLj, the (j+1)th write scan line GWLj+1, and the j-th light emission control line ELj may transmit a j-th initialization scan signal GIj, a j-th compensation scan signal GCj, a j-th write scan signal GWj, a (j+1)th write scan signal GWj+1, and a j-th light emission control signal EMj to the pixel PX, respectively. The i-th data line DLi may transmit an i-th data signal Di to the pixel PX. The i-th data signal Di may have a voltage level corresponding to an image signal input to the display device DD.

First and second driving voltage lines VL1 and VL2 may transmit a first driving voltage ELVDD and a second driving voltage ELVSS to the pixel PX, respectively. In addition, a first initialization voltage line VL3 may transmit a first initialization voltage VINT1 to the pixel PX.

The first transistor T1 may be connected between the first driving voltage line VL1 receiving the first driving voltage ELVDD and the light emitting element ED. The first transistor T1 may include a first electrode connected to the first driving voltage line VL1 via the fifth transistor T5, a second electrode electrically connected to an anode of the light emitting element ED via the sixth transistor T6, and a third electrode connected to one end of the storage capacitor Cst. The first transistor T1 may receive the i-th data signal Di transmitted by the i-th data line DLi according to a switching operation of the second transistor T2 and may supply a driving current to the light emitting element ED.

The second transistor T2 may be connected between the i-th data line DLi and the first electrode of the first transistor T1. The second transistor T2 may include a first electrode connected to the i-th data line DLi, a second electrode connected to the first electrode of the first transistor T1, and a third electrode connected to the j-th write scan line GWLj. The second transistor T2 may be turned on in response to the j-th write scan signal GWj applied thereto via the j-th write scan line GWLj and may transmit the i-th data signal Di applied thereto via the i-th data line DLi to the first electrode of the first transistor T1.

The third transistor T3 may be connected between the second electrode of the first transistor T1 and a first node N1. The third transistor T3 may include a first electrode connected to the third electrode of the first transistor T1, a second electrode connected to the second electrode of the first transistor T1, and a third electrode connected to the j-th compensation scan line GCLj. The third transistor T3 may be turned on in response to the j-th compensation scan signal GCj applied thereto via the j-th compensation scan line GCLj and may connect the third electrode and the second electrode of the first transistor T1 to each other to allow the first transistor T1 to be connected in a diode configuration.

The fourth transistor T4 may be connected between the first initialization voltage line VL3 to which the first initialization voltage VINT is applied and the first node N1. The fourth transistor T4 may include a first electrode connected to the third electrode of the first transistor T1, a second electrode connected to the first initialization voltage line VL3 to which the first initialization voltage VINT1 is applied, and a third electrode connected to the j-th initialization scan line GILj. The fourth transistor T4 may be turned on in response to the j-th initialization scan signal GIj applied thereto via the j-th initialization scan line GILj. The turned-on fourth transistor T4 may transmit the first initialization voltage VINT1 to the third electrode of the first transistor T1 to initialize an electric potential of the third electrode (i.e., the first node N1) of the first transistor T1.

The fifth transistor T5 may include a first electrode connected to the first driving voltage line VL1, a second electrode connected to the first electrode of the first transistor T1, and a third electrode connected to the j-th light emission control line ELj.

The sixth transistor T6 may include a first electrode connected to the second electrode of the first transistor T1, a second electrode connected to the anode of the light emitting element ED, and a third electrode connected to the j-th light emission control line ELj.

The fifth transistor T5 and the sixth transistor T6 may be substantially simultaneously turned on in response to the j-th light emission control signal EMj applied thereto via the j-th light emission control line ELj. The first driving voltage ELVDD applied via the turned-on fifth transistor T5 may be compensated for by the first transistor T1 connected in the diode configuration and may be transmitted to the light emitting element ED via the first transistor T1.

The seventh transistor T7 may include a first electrode connected to the first initialization voltage line VL3 to which the first initialization voltage VINT1 is applied, a second electrode connected to the second electrode of the sixth transistor T6, and a third electrode connected to the (j+1)th write scan line GWLj+1. As an example, the first initialization voltage VINT1 may have a negative constant voltage. For example, the first initialization voltage VINT1 may have a voltage level of about −3.5 volts, however the first initialization voltage VINT1 is not limited thereto.

As described above, the one end of the storage capacitor Cst may be connected to the third electrode of the first transistor T1, and the other end of the storage capacitor Cst may be connected to the first driving voltage line VL1. A cathode of the light emitting element ED may be connected to the second driving voltage line VL2 that transmits the second driving voltage ELVSS. The second driving voltage ELVSS may have a voltage level lower than that of the first driving voltage ELVDD. As an example, the second driving voltage ELVSS may have the voltage level lower than that of the first initialization voltage VINT.

Figure 5:
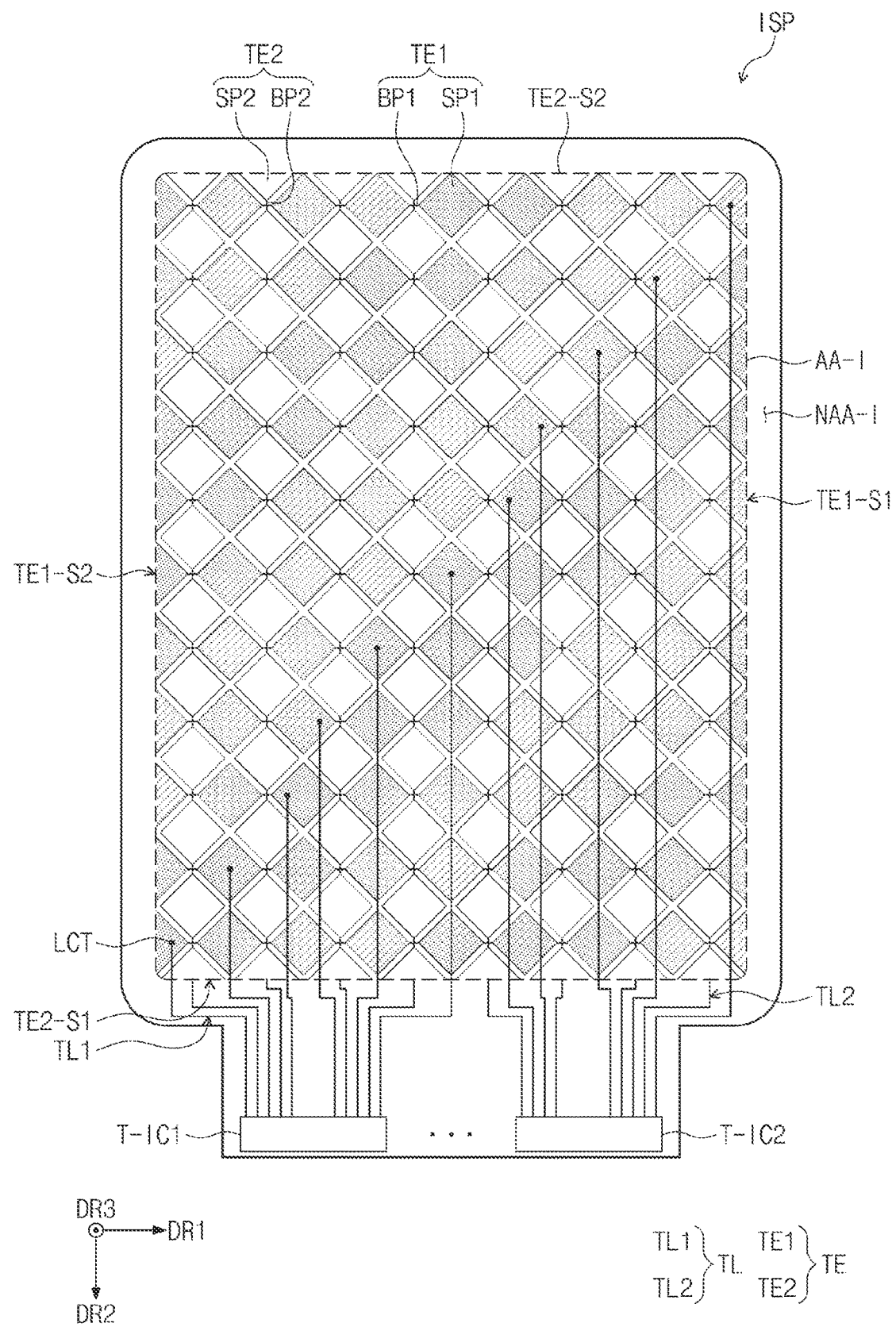
FIG. 5 is a plan view of an input sensor according to an embodiment of the present disclosure.

FIG. 5 is a plan view of the input sensor ISP according to an embodiment of the present disclosure. Hereinafter, the input sensor ISP will be described in detail with reference to FIGS. 3 and 5.

Referring to FIG. 5, the input sensor ISP may include an active area AA-I and a peripheral area NAA-I defined adjacent to the active area AA-I. The active area AA-I and the peripheral area NAA-I of the input sensor ISP may correspond to the display area DA and the non-display area NDA of the display panel DP, respectively. That is, the active area AA-I of the input sensor ISP may overlap the display area DA in which the light emitting elements of the pixels PX are arranged. According to embodiments, the active area AA-I may have a rectangular shape with short sides extending in the first direction DR1 and long sides extending in the second direction DR2 as shown in FIG. 5.

According to an embodiment, the input sensor ISP may include a plurality of sensing electrodes TE, a plurality of trace lines TL respectively connected to the sensing electrodes TE, and sensing controllers T-IC1 and T-IC2.

The sensing electrodes TE may include a first sensing electrode TE1 and a second sensing electrode TE2.

The first sensing electrode TE1 may be arranged in a plurality of rows extending in the first direction DR1 and arranged in the second direction DR2. The first sensing electrode TE1 may include a plurality of first sensing patterns SP1 and a plurality of first conductive patterns BP1. The the first sensing patterns SP1 may extend in the first direction DR1. The first sensing patterns SP1 and the first conductive patterns BP1 may be patterned through the same process and may be provided integrally with each other.

The first sensing electrode TE1 may include a plurality of row sensing electrodes. The first sensing electrode TE1 may include the row sensing electrodes extending in the first direction DR1 and spaced apart from each other in the second direction DR2. The row sensing electrodes may be sensing electrodes sequentially arranged in the first direction DR1. In embodiments of the present disclosure, the row sensing electrodes include eleven row sensing electrodes as a representative example, however, the present disclosure is not limited thereto. For example, according to embodiments, the number of the row sensing electrodes may be equal to or smaller than 10 or equal to or greater than 12. The first sensing electrode TE1 may include a first side TE1-S1 and a second side TE1-S2, which are spaced apart from each other in the first direction DR1.

The second sensing electrode TE2 may include a plurality of columns extending in the second direction DR2 and arranged in the first direction DR1. The second sensing electrode TE2 may include a plurality of second sensing patterns SP2 and a plurality of second conductive patterns BP2. The second sensing patterns SP2 may extend in the second direction DR2. Each of the second conductive patterns BP2 may be connected to two second sensing patterns SP2 adjacent to each other and may electrically connect the two second sensing patterns SP2 adjacent to each other. In the present disclosure, the second conductive patterns BP2 may be referred to as bridge patterns.

According to embodiments, the second sensing electrode TE2 may include a plurality of column sensing electrodes. The second sensing electrode TE2 may include the column sensing electrodes extending in the second direction DR2 and spaced apart from each other in the first direction DR1. The column sensing electrodes may be sensing electrodes sequentially arranged in the first direction DR1. In embodiments of the present disclosure, the column sensing electrodes include eight column sensing electrodes as a representative example, however, the present disclosure is not limited thereto. For example, according to embodiments, the number of the column sensing electrodes may be equal to or smaller than 7 or equal to or greater than 9. The second sensing electrode TE2 may include a third side TE2-S1 and a fourth side TE2-S2, which are spaced apart from each other in the second direction DR2.

According to embodiments, each of the first sensing electrode TE1 and the second sensing electrode TE2 may include a plurality of conductive lines crossing each other and may have a mesh shape with a plurality of openings. The first sensing pattern SP1 and the first conductive pattern BP1, which are included in the first sensing electrode TE1, and the second sensing pattern SP2 may have the mesh shape. According to embodiments of the present disclosure, since each of the first sensing electrodes TE1 and the second sensing pattern SP2 have the mesh structure, a base capacitance caused by a parasitic capacitance between the first sensing electrodes TE1 and the second electrode CE (refer to FIG. 3) and a base capacitance caused by a parasitic capacitance between the second sensing electrodes TE2 and the second electrode CE (refer to FIG. 3) may be reduced compared with a case where each of the first sensing electrodes TE1 and the second sensing pattern SP2 have an electrode shape without an opening. Accordingly, as each of the first sensing electrodes TE1 and the second sensing pattern SP2 have the mesh structure, a touch sensitivity of the input sensor ISP may be increased. In addition, a portion of mesh lines, which form the first sensing pattern SP1 and the second sensing pattern SP2, may be removed in a closed curve line, and a dummy pattern, which is surrounded by the closed curve line and electrically insulated, may be further provided to further reduce the parasitic capacitance. The mesh shape of the sensing electrode TE will be described in detail with reference to FIGS. 6 to 11.

Each of the first sensing patterns SP1, the second sensing patterns SP2, the first conductive pattern BP1, and the second conductive pattern BP2 may be included in the first sensor conductive layer ICL1 and/or the second sensor conductive layer ICL2 described with reference to FIG. 3. Each of the first sensing patterns SP1 and the second sensing patterns SP2 may be included in both the first sensor conductive layer ICL1 and the second sensor conductive layer ICL2 described with reference to FIG. 3. That is, each of the first sensing patterns SP1 and the second sensing patterns SP2 may have a two-layer structure including an electrode pattern layer corresponding to the first sensor conductive layer ICL1 and an electrode pattern layer corresponding to the second sensor conductive layer ICL2. The first conductive pattern BP1 may be included in the second sensor conductive layer ICL2 described with reference to FIG. 3, and the second conductive pattern BP2 may be included in the first sensor conductive layer ICL1 described with reference to FIG. 3. This will be described in more detail with reference to FIGS. 6 to 11.

The trace lines TL may include first trace lines TL1 and second trace lines TL2. Each of the first trace lines TL1 may be connected to a corresponding one of the first sensing electrodes TE1, and each of the second trace lines TL2 may be connected to a corresponding one of the second sensing electrodes TE2. Each of the first trace lines TL1 may be connected to a corresponding one of the row sensing electrodes included in the first sensing electrode TE1, and each of the second trace lines TL2 may be connected to a corresponding one of the column sensing electrodes included in the second sensing electrode TE2. Each of the second trace lines TL2 may be connected to the third side TE2-S1 of the second sensing electrode TE2 as shown in FIG. 5. The second trace lines TL2 may overlap the peripheral area NAA-I.

As shown in FIG. 5, at least a portion of each of the first trace lines TL1 may be arranged in the active area AA-I. As an example, according to embodiments, the first trace lines TL1 are not arranged in the peripheral area NAA-I adjacent to the active area AA-I in the first direction DR1. Accordingly, a size of the peripheral area NAA-I may be reduced. As a result, a size of bezel area in the display surface IS (refer to FIG. 1A) of the electronic device ELD (refer to FIG. 1A) may be reduced, and thus, a narrow bezel may be implemented.

The first trace lines TL1 may be arranged in the active area AA-I, may extend in a direction opposite to the second direction DR2, and may be connected to corresponding first sensing electrodes TE1 via corresponding line contacts LCT. According to an embodiment, the line contacts LCT may overlap the active area AA-I.

FIG. 5 shows the structure in which the first trace lines TL1 are connected to the corresponding first sensing electrodes TE1 via the corresponding line contacts LCT in a one-to-one correspondence as a representative example. However, the present disclosure is not limited thereto. For example, according to an embodiment, each of the first sensing electrodes TE1 may be connected to two or more first trace lines TL1 depending on the size of the active area AA-I and the arrangement of the first sensing electrodes TE1.

FIG. 5 shows the structure in which each of the second trace lines TL2 is connected to a corresponding one second sensing electrode TE2 at the third side TE2-S1 of the second sensing electrode TE2 as a representative example. However, the present disclosure is not limited thereto. For example, according to embodiments, each of the second trace lines TL2 may be connected to a corresponding one second sensing electrode TE2 at the fourth side TE2-S2 of the second sensing electrode TE2.

As described above, the portion of each of the trace lines TL shown in FIG. 5 may be disposed in the active area AA-I. At least the portion of each of the first trace lines TL1 shown in FIG. 5 may be disposed in the active area AA-I, and the at least portion of the first trace lines TL1 disposed in the active area AA-I may replace the portion of the sensing electrode TE shown in FIG. 5. The first trace lines TL1 disposed in the active area AA-I may partially replace a portion corresponding to the first sensor conductive layer ICL1 (refer to FIG. 3) of the sensing electrode TE.

According to embodiments, driving signals that drive the first sensing electrode TE1 and the second sensing electrode TE2 may be applied to the first sensing electrode TE1 and the second sensing electrode TE2 via the second trace lines TL2 in the input sensor ISP. Signals sensed by the first sensing electrode TE1 and the second sensing electrode TE2 may be output via the first trace lines TL1.

Figure 6:
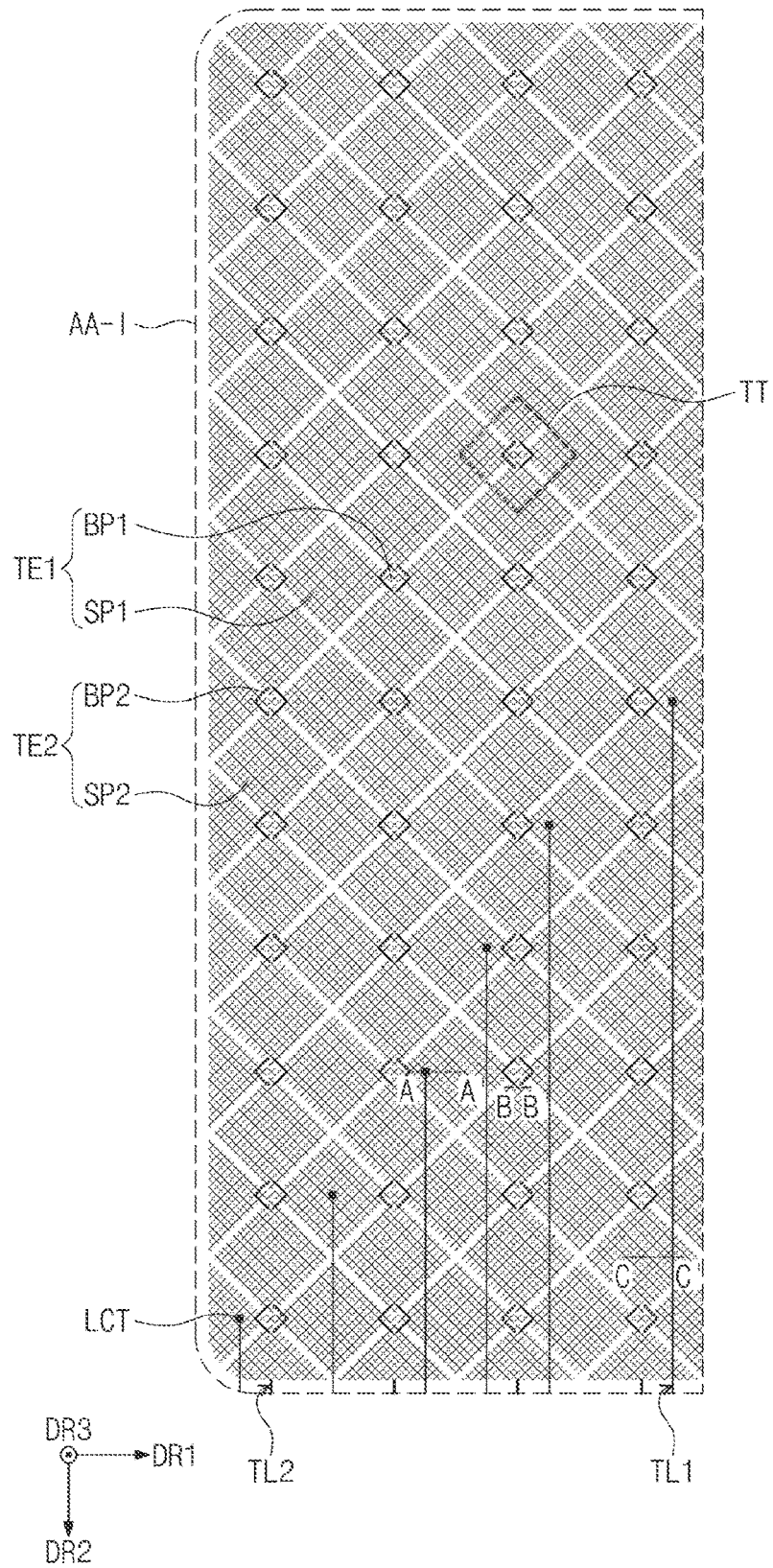
FIG. 6 is a plan view of a portion of an input sensor according to an embodiment of the present disclosure.
Figure 7A:
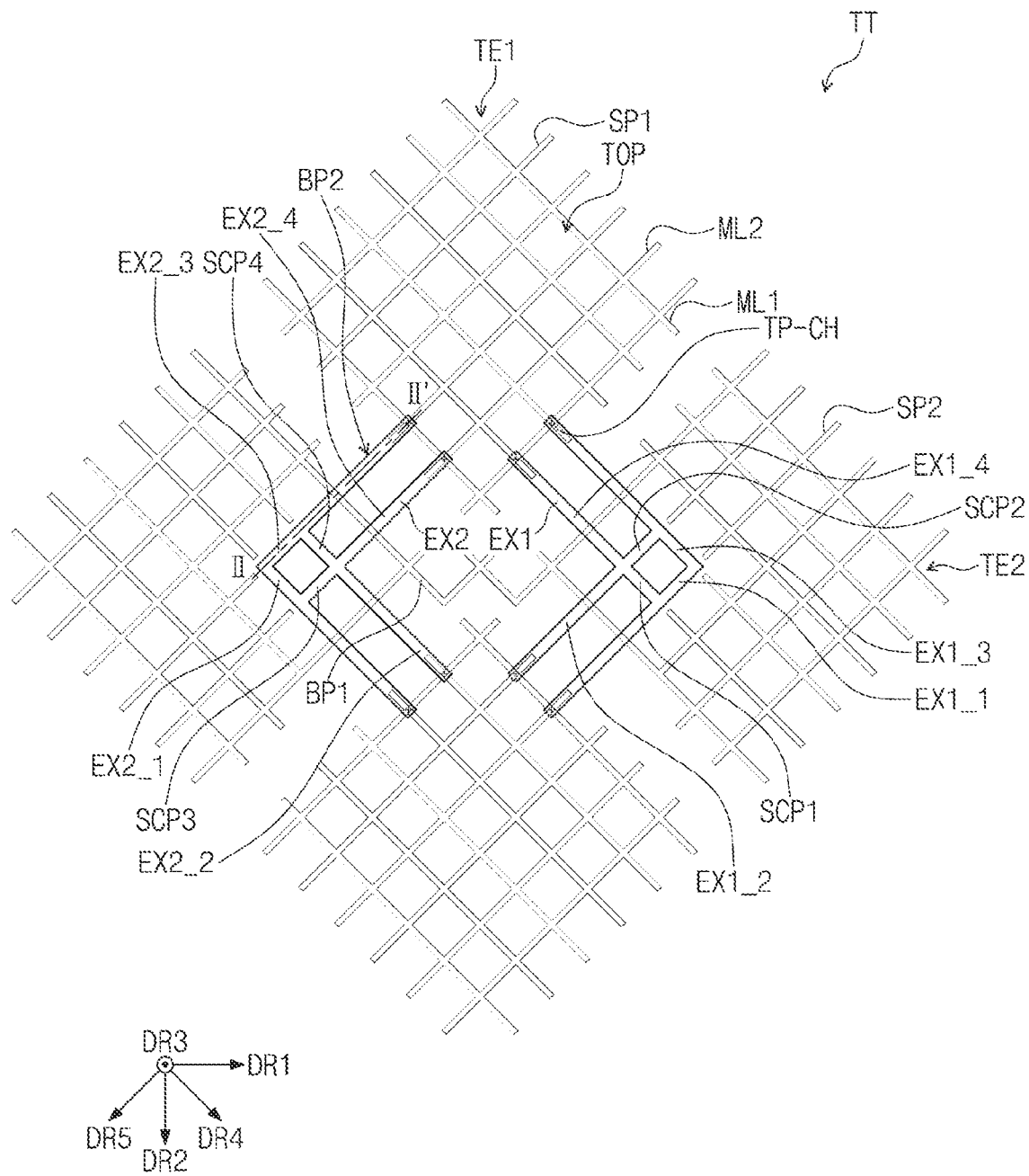
FIG. 7A is a plan view of a portion of an input sensor according to an embodiment of the present disclosure.
Figure 7B:
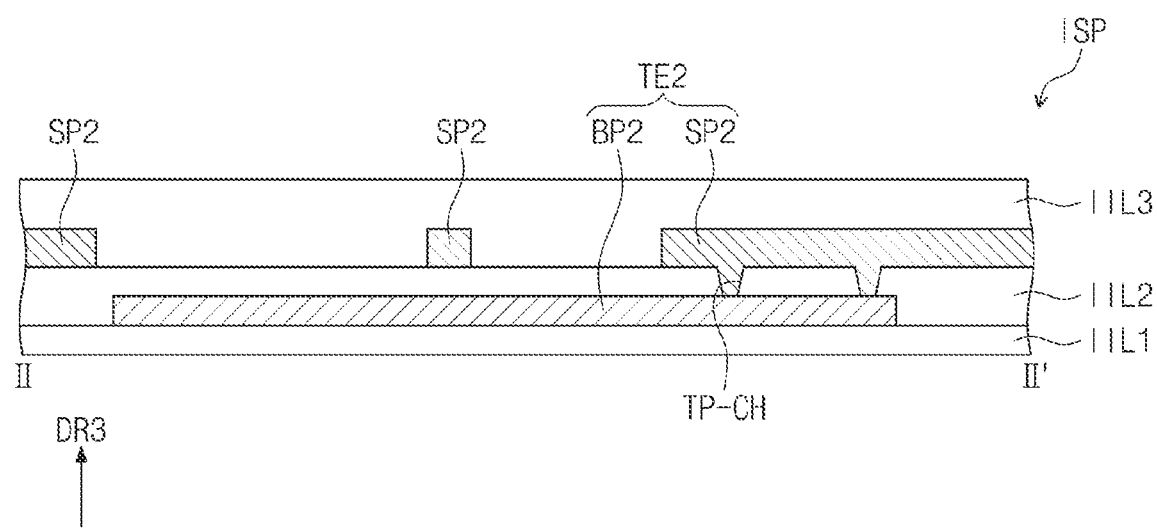
FIG. 7B is a cross-sectional view of a portion of an input sensor according to an embodiment of the present disclosure.

FIG. 6 is a plan view of a portion of the input sensor according to an embodiment of the present disclosure. FIG. 7A is a plan view of a portion of the input sensor according to an embodiment of the present disclosure. FIG. 7B is a cross-sectional view of a portion of the input sensor according to an embodiment of the present disclosure. FIG. 6 is an enlarged plan view of a portion of the active area of the input sensor shown in FIG. 5. For convenience of explanation, FIG. 6 shows the first trace lines TL1 connected to the first sensing controller T-IC1 of FIG. 5 and a left side area of the active area AA-I in which the sensing electrodes overlapping the first trace lines TL1 are disposed. FIG. 7A is an enlarged view of an area TT shown in FIG. 6. FIG. 7B shows a cross-section taken along a line II-II' shown in FIG. 7A.

Referring to FIG. 6, each of the first sensing electrodes TE1 and the second sensing electrodes TE2 may have the mesh shape, and for example, each of the first sensing electrodes TE1 and the second sensing electrodes TE2 may be a metal mesh. Each of the first sensing electrodes TE1 and the second sensing electrodes TE2 shown in FIG. 5 may have the mesh shape shown in FIG. 6.

The mesh shape of the sensing electrode TE will be described with reference to FIGS. 5, 6, 7A, and 7B.

Referring to FIGS. 5, 6, 7A, and 7B, the first sensing electrodes TE1 and the second sensing electrodes TE2 may have the mesh shape including a first mesh line ML1 and a second mesh line ML2. For example, the first mesh line ML1 may extend in a first diagonal direction DR4, and the second mesh line ML2 may extend in a second diagonal direction DR5. According to embodiments, the first trace lines TL1 may have a width equal to or smaller than a width of the first mesh line ML1 and the second mesh line ML2.

The first mesh line ML1 of each of the first sensing patterns SP1 and the second sensing patterns SP2 may cross the second mesh line ML2 of each of the first and second sensing patterns SP1 and SP2 and may be provided integrally with the second mesh line ML2 of each of the first and second sensing patterns SP1 and SP2. Touch openings TOP each having a lozenge shape may be defined by the first mesh line ML1 and the second mesh line ML2. The light emitting areas PXA (refer to FIG. 3) may be defined in the touch openings TOP. For example, the light emitting elements ED (refer to FIG. 3) may be disposed in the touch openings TOP. Since the light emitting areas PXA are disposed in the touch openings TOP, the light generated from the light emitting areas PXA (refer to FIG. 3) may be normally emitted without being influenced by the first sensing patterns SP1 and the second sensing patterns SP2. Each of the first mesh line ML1 and the second mesh line ML2 may overlap the non-light-emitting area NPXA (refer to FIG. 3).

The first sensing electrodes TE1 may include the first sensing patterns SP1 and the first conductive patterns BP1, which are arranged in the first direction DR1. The first conductive pattern BP1 may extend from the first sensing pattern SP1. The first conductive pattern BP1 may be formed integrally with the first sensing pattern SP1. The first conductive pattern BP1 may have the mesh shape. In the present disclosure, the first conductive pattern BP1 may be referred to as an extension pattern.

The second sensing electrodes TE2 may include the second sensing patterns SP2 and the second conductive patterns BP2, which are arranged in the second direction DR2. The second conductive pattern BP2 may connect two second sensing patterns SP2 adjacent to each other. According to embodiments, the second conductive pattern BP2 does not overlap the first conductive pattern BP1 while being extended and may connect the second sensing patterns SP2. The second conductive pattern BP2 may be connected to the second sensing pattern SP2 via a plurality of contact holes TP-CH. The second conductive pattern BP2 may extend toward the second sensing pattern SP2 via areas overlapping the first sensing pattern SP1. In the present disclosure, the second conductive pattern BP2 may be referred to as a bridge pattern.

Each of the first sensing pattern SP1 and the second sensing pattern SP2 may have an electrode layer structure including a plurality of layers. Each of the first sensing pattern SP1 and the second sensing pattern SP2 may be included in both the first sensor conductive layer ICL1 and the second sensor conductive layer ICL2 described with reference to FIG. 3. That is, each of the first sensing pattern SP1 and the second sensing pattern SP2 may have the two-layer structure including the electrode pattern layer corresponding to the first sensor conductive layer ICL1 and the electrode pattern layer corresponding to the second sensor conductive layer ICL2. The first conductive pattern BP1 may be included in the second sensor conductive layer ICL2 described with reference to FIG. 3, and the second conductive pattern BP2 may be included in the first sensor conductive layer ICL1 described with reference to FIG. 3. According to embodiments, the electrode pattern layer of the first sensing pattern SP1 and the second sensing pattern SP2, which corresponds to the first sensor conductive layer ICL1, may be disposed on the same layer as, may include the same material as, and may be substantially simultaneously patterned as the second conductive pattern BP2. The electrode pattern layer of the first sensing pattern SP1 and the second sensing pattern SP2, which corresponds to the second sensor conductive layer ICL2, may be disposed on the same layer as, may include the same material as, and may be substantially simultaneously patterned as the first conductive pattern BP1. The first conductive pattern BP1 may be insulated from the second conductive pattern BP2 and may be disposed between the second sensing patterns SP2.

The second conductive pattern BP2 may include a first extension portion EX1 and a second extension portion EX2 having a shape symmetrical with the first extension portion EX1. The first conductive pattern BP1 may be disposed between the first extension portion EX1 and the second extension portion EX2.

The first extension portion EX1 may connect the second sensing patterns SP2 via one first sensing pattern SP1 of two first sensing patterns SP1 shown in FIG. 7A. The second extension portion EX2 may connect the second sensing patterns SP2 via the other first sensing pattern SP1 of the two first sensing patterns SP1 shown in FIG. 7A. Since each of the first extension portion EX1 and the second extension portion EX2 connects the two second sensing patterns SP2, the two second sensing patterns SP2 may be normally connected to each other even though one of the first extension portion EX1 and the second extension portion EX2 is damaged.

Hereinafter, the two first sensing patterns SP1 may be defined respectively as a left first sensing pattern SP1 and a right first sensing pattern SP1 depending on their relative positions. The two second sensing patterns SP2 may be defined respectively as an upper second sensing pattern SP2 and a lower second sensing pattern SP2 depending on their relative positions.

Predetermined portions of the first and second extension portions EX1 and EX2, which are adjacent to one side of each of the first and second extension portions EX1 and EX2, may be connected to the lower second sensing pattern SP2 via the contact holes TP-CH. Predetermined portions of the first and second extension portions EX1 and EX2, which are adjacent to the other sides of the first and second extension portions EX1 and EX2, may be connected to the upper second sensing pattern SP2 via the contact holes TP-CH.

The first extension portion EX1 may include a first sub-extension portion EX1_1 and a second sub-extension portion EX1_2, which extend in the second diagonal direction DR5, and a third sub-extension portion EX1_3 and a fourth sub-extension portion EX1_4, which extend in the first diagonal direction DR4. The first extension portion EX1 may further include a first sub-conductive pattern SCP1 extending in the first diagonal direction DR4 and a second sub-conductive pattern SCP2 extending in the second diagonal direction DR5.

Predetermined portions of the first and second sub-extension portions EX1_1 and EX1_2, which are adjacent to one side of each of the first and second sub-extension portions EX1_1 and EX1_2, may be connected to the lower second sensing pattern SP2 via the contact holes TP-CH. Predetermined portions of the third and fourth sub-extension portions EX1_3 and EX1_4, which are adjacent to one side of each of the third and fourth sub-extension portions EX1_3 and EX1_4, may be connected to the upper second sensing pattern SP2 via the contact holes TP-CH.

The first sub-extension portion EX1_1 may extend from the third sub-extension portion EX1_3, and the second sub-extension portion EX1_2 may extend from the fourth sub-extension portion EX1_4. The first sub-conductive pattern SCP1 may connect the first sub-extension portion EX1_1, the second sub-extension portion EX1_2, and the fourth sub-extension portion EX1_4. The second sub-conductive pattern SCP2 may connect the second sub-extension portion EX1_2, the third sub-extension portion EX1_3, and the fourth sub-extension portion EX1_4. The first sub-extension portion EX1_1, the second sub-extension portion EX1_2, the third sub-extension portion EX1_3, the fourth sub-extension portion EX1_4, the first sub-conductive pattern SCP1, and the second sub-conductive pattern SCP2 may be integrally formed with each other.

According to embodiments, the first and second mesh lines ML1 and ML2 are not disposed in portions overlapping a portion of the first and second sub-extension portions EX1_1 and EX1_2, a portion of the third and fourth sub-extension portions EX1_3 and EX1_4, the first sub-conductive pattern SCP1, and the second sub-conductive pattern SCP2.

The second extension portion EX2 may include a fifth sub-extension portion EX2_1 and a sixth sub-extension portion EX2_2, which extend in the first diagonal direction DR4, and a seventh sub-extension portion EX2_3 and an eighth sub-extension portion EX2_4, which extend in the second diagonal direction DR5. The second extension portion EX2 may further include a third sub-conductive pattern SCP3 extending in the second diagonal direction DR5 and a fourth sub-conductive pattern SCP4 extending in the first diagonal direction DR4.

The left first sensing pattern SP1 may have a structure symmetrical with the right first sensing pattern SP1, and the second extension portion EX2 may have a structure symmetrical with the first extension portion EX1. That is, descriptions of the first, second, third, and fourth sub-extension portions EX1_1, EX1_2, EX1_3, and EX1_4 may be equally applied to the fifth, sixth, seventh, and eighth sub-extension portions EX2_1, EX2_2, EX2_3, and EX2_4, and descriptions of the first and second sub-conductive patterns SCP1 and SCP2 may be equally applied to the third and fourth sub-conductive patterns SCP3 and SCP4.

Referring to FIGS. 7A and 7B, the second conductive pattern BP2 may be disposed on the first sensor insulating layer IIL1. The second conductive pattern BP2 may be covered by the second sensor insulating layer IIL2.

The first sensing pattern SP1 and the second sensing pattern SP2 may be disposed on the second sensor insulating layer IIL2. The first sensing pattern SP1 and the second sensing pattern SP2 may be covered by the third sensor insulating layer IIL3.

The second sensing pattern SP2 may be connected to the second conductive pattern BP2 via the contact holes TP-CH defined through the second sensor insulating layer IIL2.

Figure 8A:
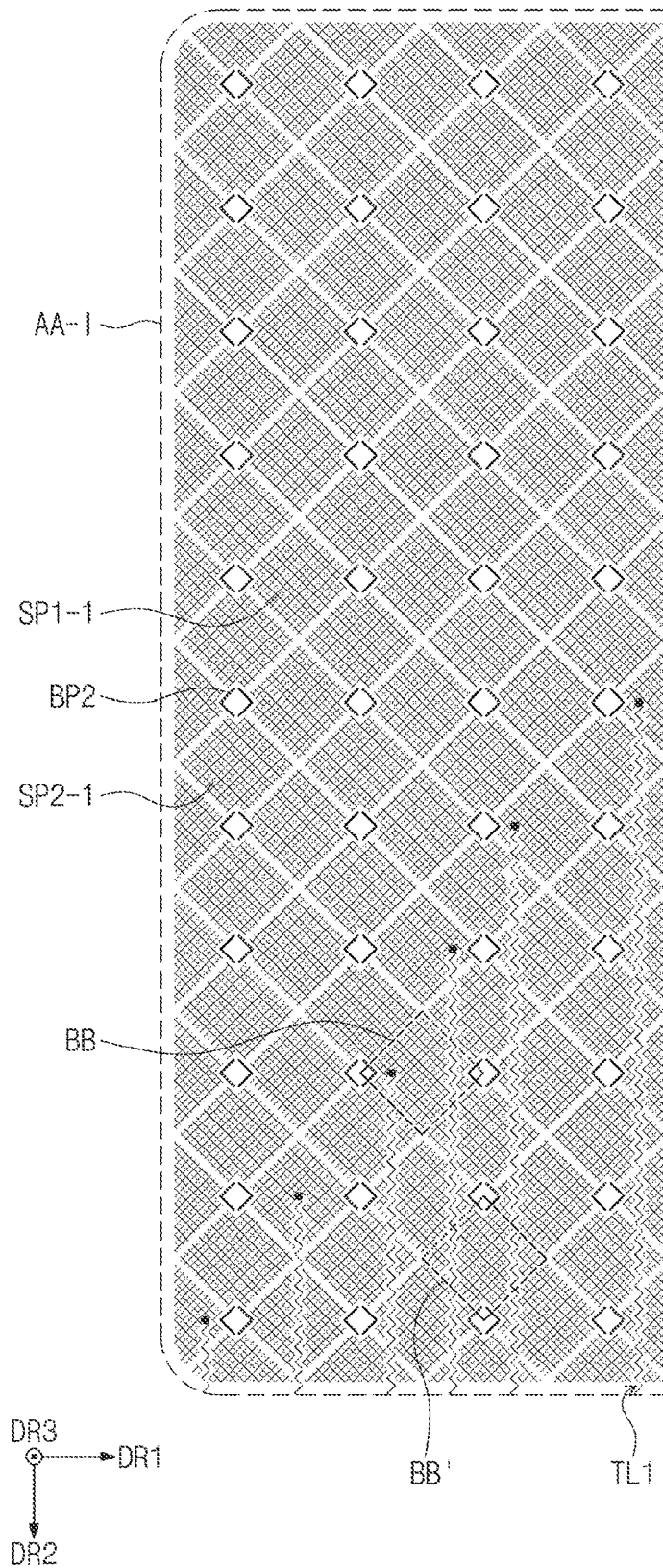
FIGS. 8A and 8B are plan views of portions of an input sensor according to an embodiment of the present disclosure.
Figure 8B:
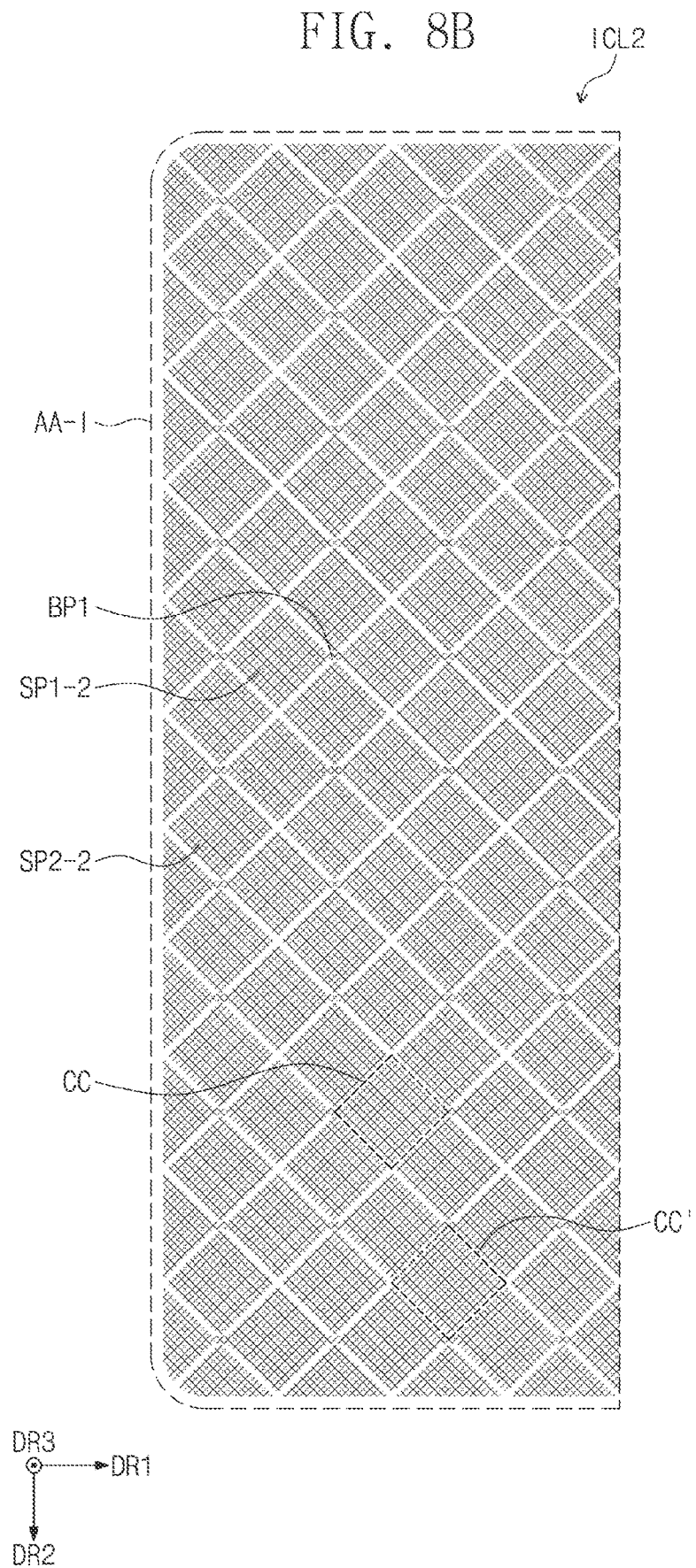

FIGS. 8A and 8B are plan views of portions of the input sensor according to an embodiment of the present disclosure. FIG. 8A shows the pattern layers among the sensing electrodes TE1 and TE2 and the first trace line TL1 shown in FIG. 6, which correspond to the first sensor conductive layer ICL1 shown in FIG. 3. FIG. 8B shows the pattern layers among the sensing electrodes TE1 and TE2 shown in FIG. 6, which correspond to the second sensor conductive layer ICL2 shown in FIG. 3.

Referring to FIGS. 3, 6, and 8A, the first sensor conductive layer ICL1 may be disposed on the first sensor insulating layer IIL1 and may include a first layer electrode SP1-1 and the first trace line TL1. The first layer electrode SP1-1 may be included in the first sensing pattern SP1 and may be the electrode pattern layer of the first sensing pattern SP1, which corresponds to the first sensor conductive layer ICL1. The first layer electrode SP1-1 may have the mesh shape shown in FIG. 8A.

The first trace lines TL1 may be disposed in the active area AA-I and may replace a portion of the first layer electrode SP1-1 having the mesh shape. That is, a metal mesh pattern of the first layer electrode SP1-1 may be omitted from an area where the first trace lines TL1 are disposed, and the first trace lines TL1 may correspond to the omitted portion. Each of the first trace lines TL1 may have the mesh shape shown in FIG. 8A.

The first sensor conductive layer ICL1 may further include a first layer sub-electrode SP2-1. The first layer sub-electrode SP2-1 may be included in the second sensing pattern SP2 and may be the electrode pattern layer of the second sensing pattern SP2, which corresponds to the first sensor conductive layer ICL1. The first layer sub-electrode SP2-1 may have the mesh shape shown in FIG. 8A.

The first trace lines TL1 may replace a portion of the first layer sub-electrode SP2-1 having the mesh shape. That is, a metal mesh pattern of the first layer sub-electrode SP2-1 may be omitted from the area where the first trace lines TL1 are disposed, and the first trace lines TL1 may correspond to the omitted portion.

The first sensor conductive layer ICL1 may further include the second conductive patterns BP2. As described above, the second conductive pattern BP2 may connect the two second sensing patterns SP2 adjacent to each other. The second conductive pattern BP2 may be electrically connected to a second layer sub-electrode SP2-2 (refer to FIG. 8B) described below. According to embodiments, the metal mesh pattern of the first layer electrode SP1-1 and the first layer sub-electrode SP2-1 may be omitted from an area where the second conductive pattern BP2 is disposed, and the second conductive pattern BP2 may correspond to the omitted portion.

Referring to FIGS. 3, 6, and 8B, the second sensor conductive layer ICL2 may be disposed on the second sensor insulating layer IIL2 and may include a second layer electrode SP1-2. The second layer electrode SP1-2 may be included in the first sensing pattern SP1 and may be the electrode pattern layer of the first sensing pattern SP1, which corresponds to the second sensor conductive layer ICL2. The second layer electrode SP1-2 may have a mesh shape shown in FIG. 8B. The second layer electrode SP1-2 may overlap each of the first layer electrode SP1-1 and the first trace line TL1. The second layer electrode SP1-2 may be electrically connected to the first layer electrode SP1-1.

The second sensor conductive layer ICL2 may further include the second layer sub-electrode SP2-2. The second layer sub-electrode SP2-2 may be included in the second sensing pattern SP2 and may be an electrode pattern layer of the second sensing pattern SP2, which corresponds to the second sensor conductive layer ICL2. The second layer sub-electrode SP2-2 may have the mesh shape shown in FIG. 8B. The second layer sub-electrode SP2-2 may overlap the first layer sub-electrode SP2-1. The second layer sub-electrode SP2-2 may overlap at least a portion of the first trace line TL1. The second layer sub-electrode SP2-2 may be electrically connected to the first layer sub-electrode SP2-1.

The second sensor conductive layer ICL2 may include the first conductive patterns BP1. As described above, each of the first conductive patterns BP1 may connect the two first sensing patterns SP1 adjacent to each other. For example, each of the first conductive patterns BP1 may be disposed between the two first sensing patterns SP1 adjacent to each other and may connect the second layer electrodes SP1-2 to each other. The first conductive pattern BP1 may include the same material as that of the second layer electrode SP1-2 and may be provided integrally with the second layer electrode SP1-2. The first conductive pattern BP1 may have a shape integrally provided with the second layer electrode SP1-2.

Figure 9A:
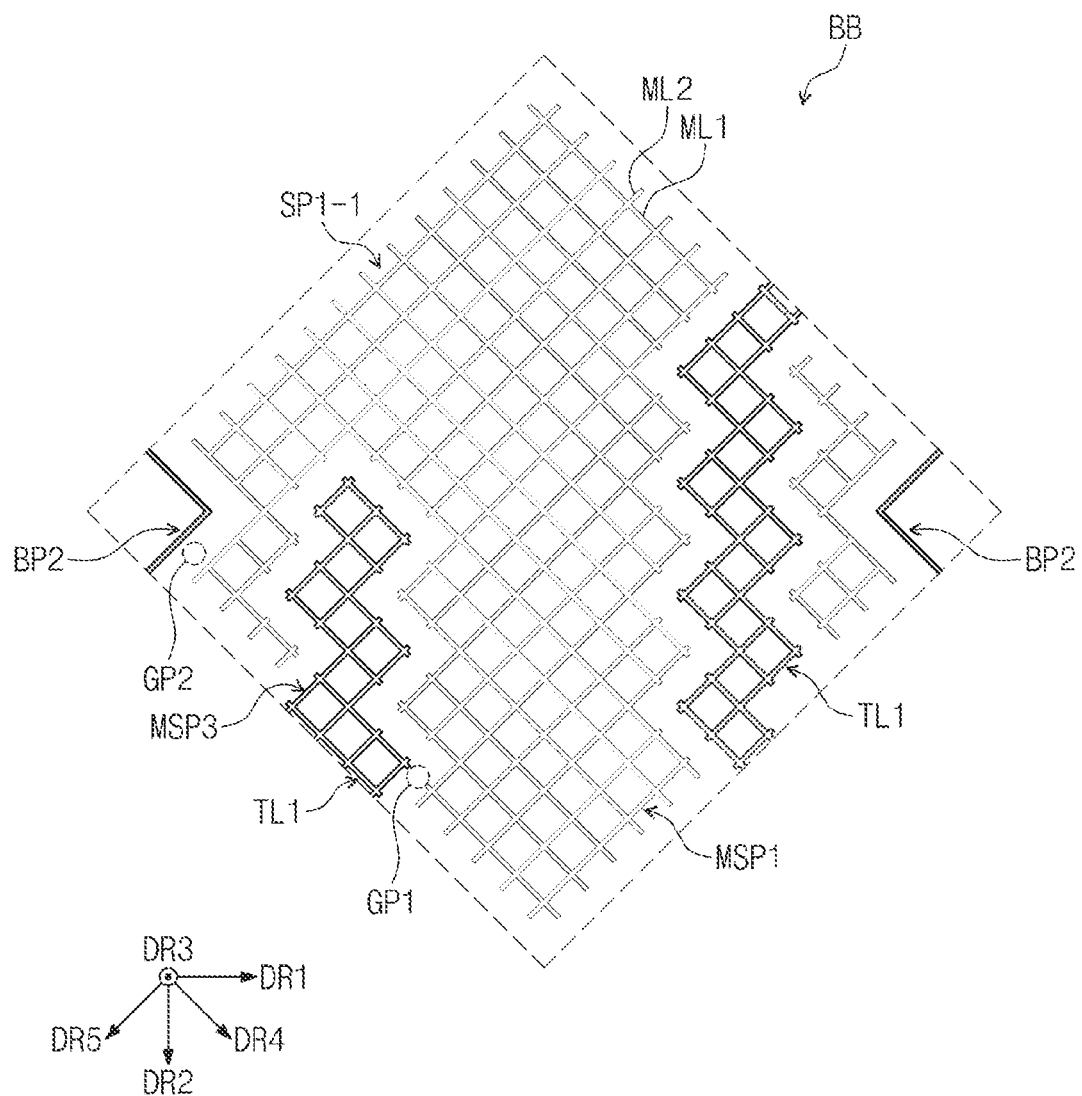
FIGS. 9A and 9B are enlarged plan views of portions of an input sensor according to an embodiment of the present disclosure.
Figure 9B:
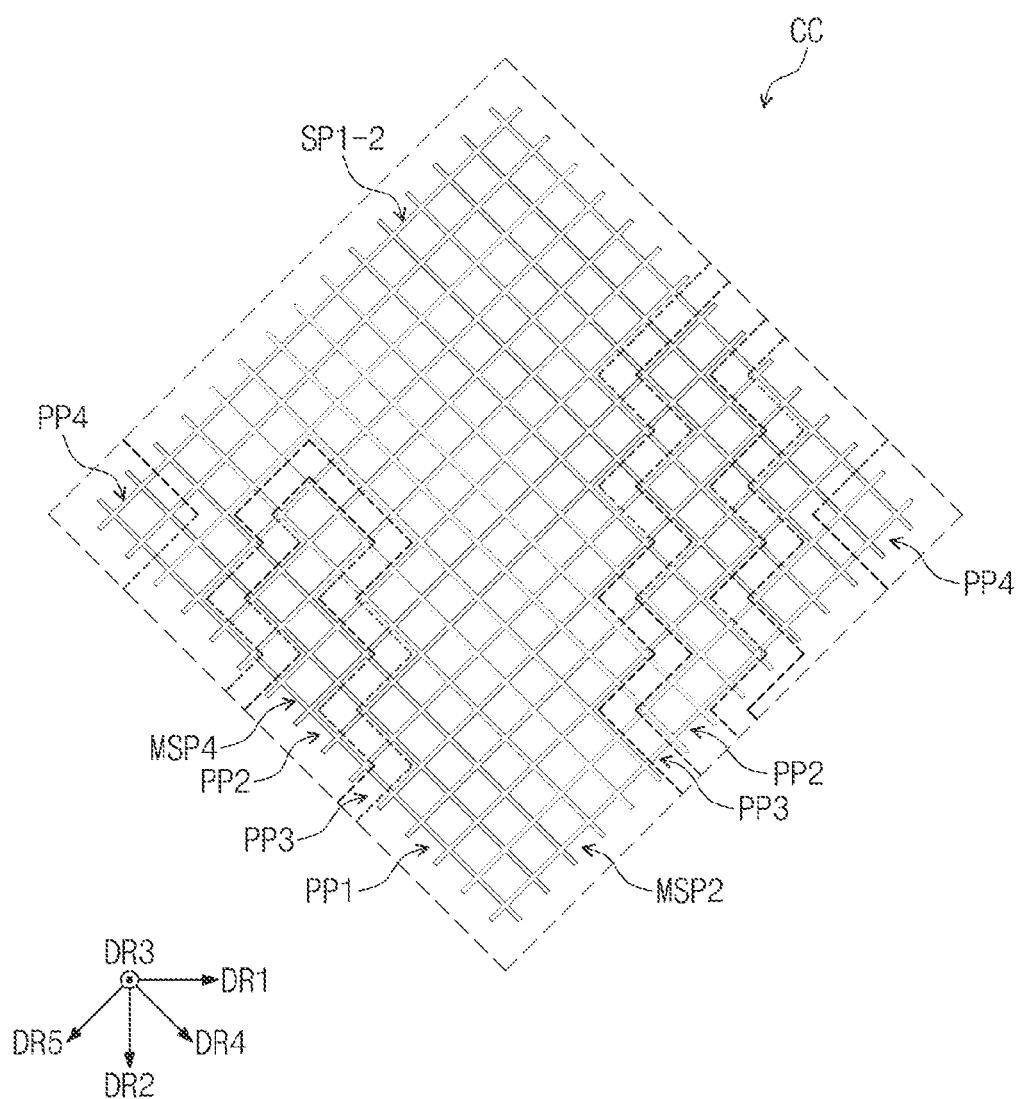
Figure 10A:
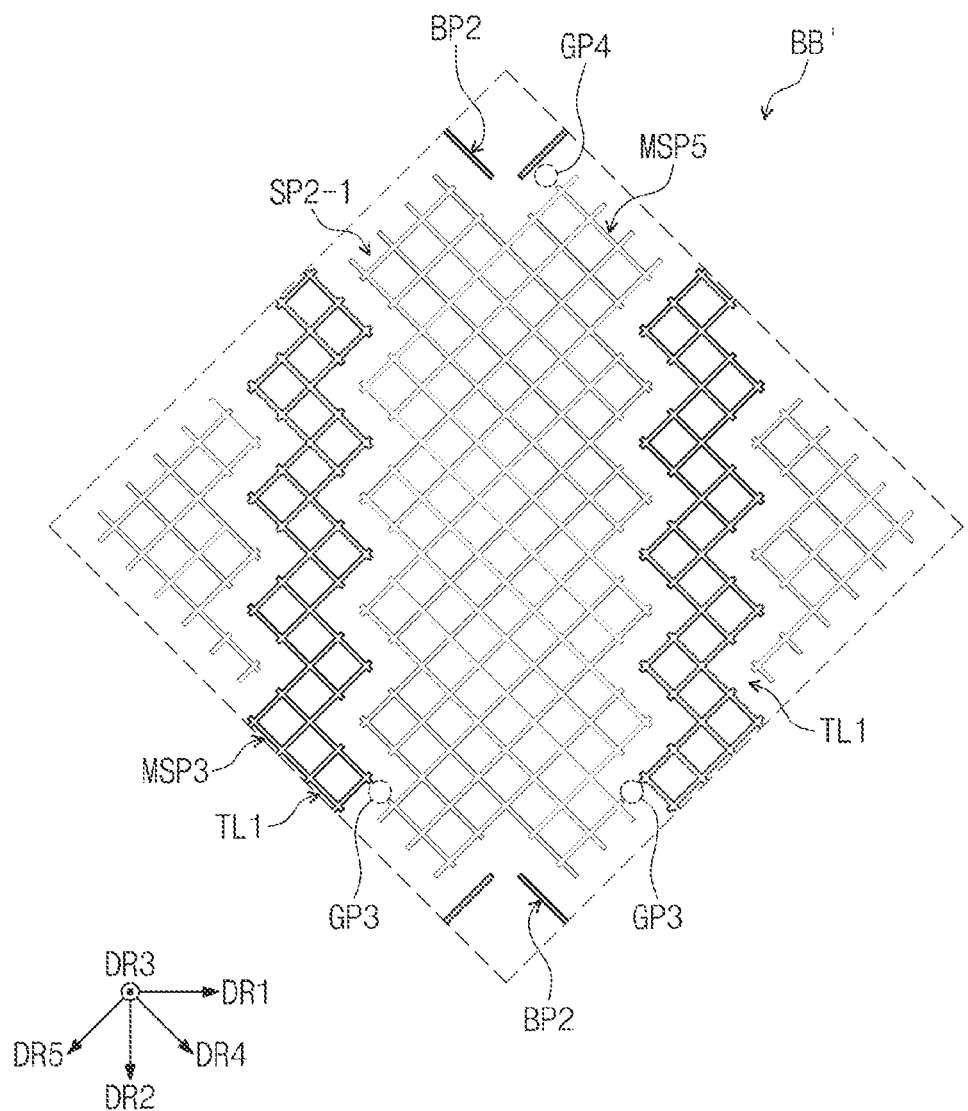
FIGS. 10A and 10B are enlarged plan views of portions of an input sensor according to an embodiment of the present disclosure.
Figure 10B:
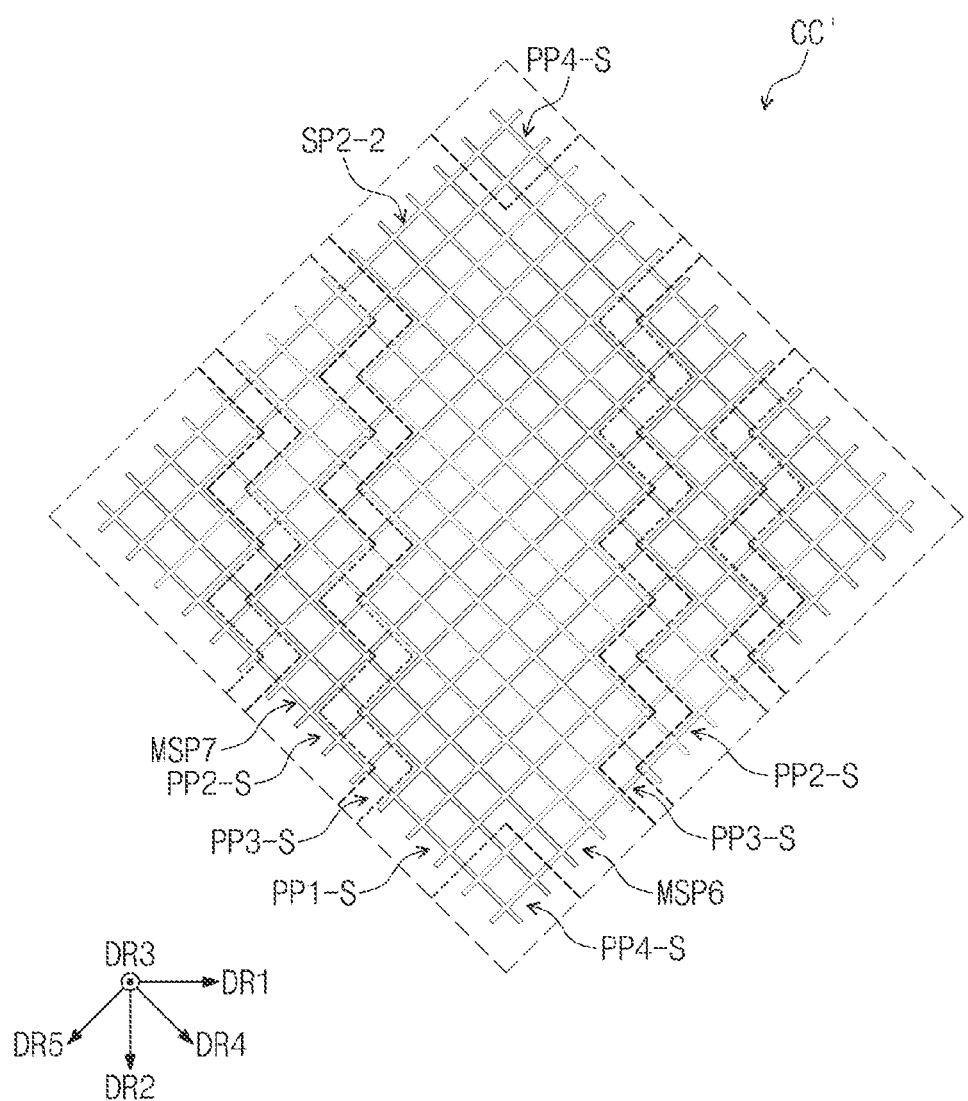

FIGS. 9A and 9B are enlarged plan views of portions of an input sensor according to an embodiment of the present disclosure. FIGS. 10A and 10B are enlarged plan views of portions of an input sensor according to an embodiment of the present disclosure. FIG. 9A is an enlarged view of an area BB shown in FIG. 8A, and FIG. 9B is an enlarged view of an area CC shown in FIG. 8B. FIG. 10A is an enlarged view of an area BB' shown in FIG. 8A, and FIG. 10B is an enlarged view of an area CC' shown in FIG. 8B. FIGS. 9A and 9B show the first sensing pattern SP1 and the first trace line TL1, which are disposed in the first sensor conductive layer ICL1 and the second sensor conductive layer ICL2, in the area BB and the area CC overlapping the area BB. FIGS. 10A and 10B show the second sensing pattern SP2 and the first trace line TL1, which are disposed in the first sensor conductive layer ICL1 and the second sensor conductive layer ICL2, in the area BB' and the area CC' overlapping the area BB'.

Referring to FIGS. 8A, 8B, 9A, and 9B, the first trace lines TL1 and the second conductive patterns BP2 may replace the portion of the first layer electrode SP1-1, and each of the first trace lines TL1 and the first layer electrode SP1-1 may have a mesh pattern structure including the first mesh line ML1 extending in the first diagonal direction DR4 and the second mesh line ML2 extending in the second diagonal direction DR5. For example, the first layer electrode SP1-1 may include a first mesh pattern MSP1 including a plurality of first mesh lines ML1 and a plurality of second mesh lines ML2, and the first trace lines TL1 may include a third mesh pattern MSP3 including a plurality of first mesh lines ML1 and a plurality of second mesh lines ML2.

A first gap GP1 may be defined between the first trace lines TL1 and the first layer electrode SP1-1. The first gap GP1 may correspond to a cut portion where the metal mesh included in each of the first trace lines TL1 and the first layer electrode SP1-1 is cut. The first trace lines TL1 and the first layer electrode SP1-1 may be formed by forming a metal mesh pattern having a single unitary form and cutting away a portion of the metal mesh pattern, which corresponds to the first gap GP1. A second gap GP2 may be defined between the second conductive pattern BP2 and the first layer electrode SP1-1. The second gap GP2 may be a cut portion where the metal mesh included in each of the second conductive pattern BP2 and the first layer electrode SP1-1 is cut. The second conductive pattern BP2 and the first layer electrode SP1-1 may be formed by forming a metal mesh pattern having a single unitary form and cutting away a portion of the metal mesh pattern, which corresponds to the second gap GP2.

The second layer electrode SP1-2 may overlap each of the first layer electrode SP1-1 and the first trace lines TL1. The second layer electrode SP1-2 may include a first portion PP1 overlapping the first layer electrode SP1-1 when viewed in the plane and a second portion PP2 overlapping the first trace lines TL1 when viewed in the plane. The second layer electrode SP1-2 may be electrically connected to the first layer electrode SP1-1. The second layer electrode SP1-2 may be electrically connected to the first layer electrode SP1-1 through first electrode contacts overlapping the active area AA-I.

According to embodiments, each of the first portion PP1 and the second portion PP2 may have a mesh pattern structure including the first mesh lines ML1 and the second mesh lines ML2. For example, the first portion PP1 may include a second mesh pattern MSP2 including a plurality of first mesh lines ML1 and a plurality second mesh lines ML2, and the second portion PP2 may include a fourth mesh pattern MSP4 including a plurality of first mesh lines ML1 and a plurality of second mesh lines ML2. The second mesh pattern MSP2 may overlap at least a portion of the first mesh pattern MSP1 included in the first layer electrode SP1-1, and the fourth mesh pattern MSP4 may be overlap at least a portion of the third mesh pattern MSP3 included in the first trace lines TL1. According to embodiments, the first mesh pattern MSP1 and the second mesh pattern MSP2 may be disposed in a configuration that allows their respective mesh lines to overlap each other, and the third mesh pattern MSP3 and the fourth mesh pattern MSP4 may be disposed in a configuration that allows their respective mesh lines to overlap each other.

The second layer electrode SP1-2 may also overlap the first gap GP1 defined between the first trace lines TL1 and the first layer electrode SP1-1. The second layer electrode SP1-2 may further include a third portion PP3 overlapping the first gap GP1. The second layer electrode SP1-2 may overlap the second conductive pattern BP2 and the second gap GP2. The second layer electrode SP1-2 may further include a fourth portion PP4 overlapping the second conductive pattern BP2 and the second gap GP2.

The first portion PP1, the second portion PP2, the third portion PP3, and the fourth portion PP4, which are included in the second layer electrode SP1-2, may be connected to each other to have a single unitary form without being distinguished from each other. The second layer electrode SP1-2 may include the first portion PP1, the second portion PP2, the third portion PP3, and the fourth portion PP4.

Referring to FIGS. 8A, 8B, 9A, 9B, 10A, and 10B, the first trace lines TL1 and the second conductive patterns BP2 may replace a portion of the first layer sub-electrode SP2-1, and each of the first trace lines TL1 and the first layer sub-electrode SP2-1 may have a mesh pattern structure including a first mesh line ML1 extending in the first diagonal direction DR4 and a second mesh line ML2 extending in the second diagonal direction DR5. For example, the first layer sub-electrode SP2-1 may include a fifth mesh pattern MSP5 including a plurality of first mesh lines ML1 and a plurality of second mesh lines ML2, and the first trace lines TL1 may include the third mesh pattern MSP3 including a plurality of first mesh lines ML1 and a plurality of second mesh lines ML2 as described above.

A third gap GP3 may be defined between the first trace lines TL1 and the first layer sub-electrode SP2-1. The third gap GP3 may correspond to a cut portion where the metal mesh included in each of the first trace lines TL1 and the first layer sub-electrode SP2-1 is cut. The first trace lines TL1 and the first layer sub-electrode SP2-1 may be formed by forming a metal mesh pattern having a single unitary form and cutting away a portion of the metal mesh pattern, which corresponds to the third gap GP3. A fourth gap GP4 may be defined between the second conductive pattern BP2 and the first layer sub-electrode SP2-1. The fourth gap GP4 may correspond to a cut portion where the metal mesh included in each of the second conductive pattern BP2 and the first layer sub-electrode SP2-1 is cut. The second conductive pattern BP2 and the first layer sub-electrode SP2-1 may be formed by forming a metal mesh pattern having a single unitary form and cutting away a portion of the metal mesh pattern, which corresponds to the fourth gap GP4.

The second layer sub-electrode SP2-2 may overlap each of the first layer sub-electrode SP2-1 and the first trace lines TL1. The second layer sub-electrode SP2-2 may include a first sub-portion PP1-S overlapping the first layer sub-electrode SP2-1 when viewed in the plane and a second sub-portion PP2-S overlapping the first trace lines TL1 when viewed in the plane. The second layer sub-electrode SP2-2 may be electrically connected to the first layer sub-electrode SP2-1. The second layer sub-electrode SP2-2 may be electrically connected to the first layer sub-electrode SP2-1 through a plurality of second electrode contacts overlapping the active area AA-I.

According to embodiments, each of the first sub-portion PP1-S and the second sub-portion PP2-S may have a mesh pattern structure including a plurality of first mesh lines ML1 and a plurality of second mesh lines ML2. For example, the first sub-portion PP1-S may include a sixth mesh pattern MSP6 including the first mesh lines ML1 and the second mesh lines ML2, and the second sub-portion PP2-S may include a seventh mesh pattern MSP7 including the first mesh lines ML1 and the second mesh lines ML2. The sixth mesh pattern MSP6 may overlap at least a portion of the fifth mesh pattern MSP5 included in the first layer sub-electrode SP2-1, and the seventh mesh pattern MSP7 may overlap at least a portion of the third mesh pattern MSP3 included in the first trace lines TL1. According to embodiments, the fifth mesh pattern MSP5 and the sixth mesh pattern MSP6 may be disposed in a configuration that allows their respective mesh lines to overlap each other, and the third mesh pattern MSP3 and the seventh mesh pattern MSP7 may be disposed in a configuration that allows their respective mesh lines to overlap each other.

The second layer sub-electrode SP2-2 may overlap the third gap GP3 defined between the first trace lines TL1 and the first layer sub-electrode SP2-1. The second layer sub-electrode SP2-2 may further include a third sub-portion PP3-S overlapping the third gap GP3. The second layer sub-electrode SP2-2 may also overlap the second conductive pattern BP2 and the fourth gap GP4. The second layer sub-electrode SP2-2 may further include a fourth sub-portion PP4-S overlapping the second conductive pattern BP2 and the fourth gap GP4.

The first sub-portion PP1-S, the second sub-portion PP2-S, the third sub-portion PP3-S, and the fourth sub-portion PP4-S, which are included in the second layer sub-electrode SP2-2, may be connected to each other to have a single unitary form without being distinguished from each other. The second layer sub-electrode SP2-2 may include the first sub-portion PP1-S, the second sub-portion PP2-S, the third sub-portion PP3-S, and the fourth sub-portion PP4-S.

Figure 11:
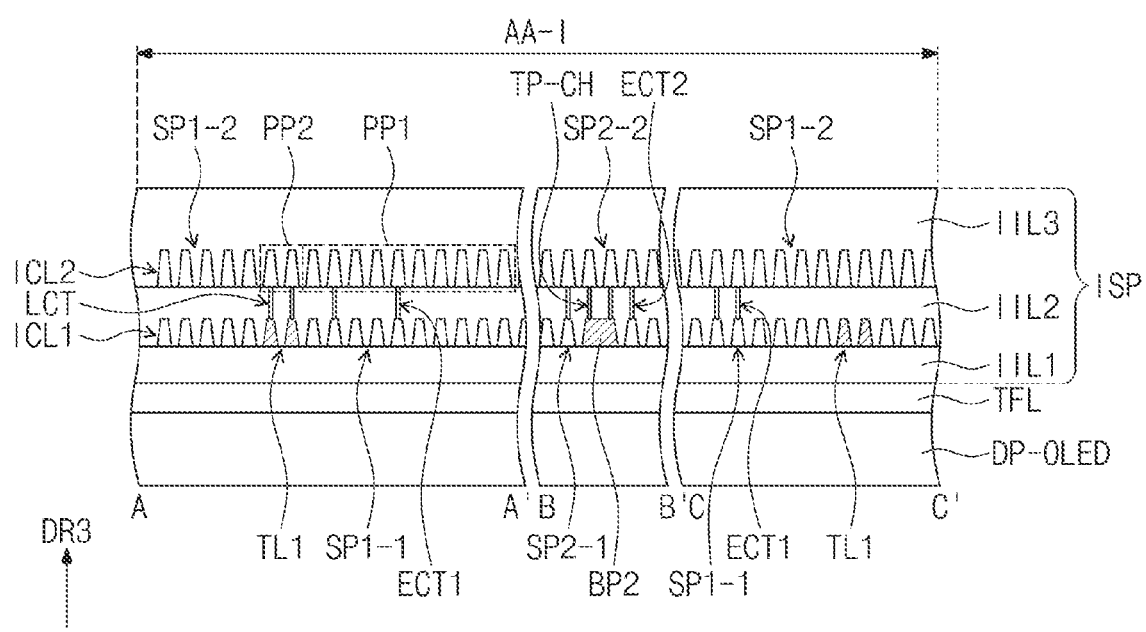
FIG. 11 is a cross-sectional view of a portion of an input sensor according to an embodiment of the present disclosure.

FIG. 11 is a cross-sectional view of a portion of the input sensor according to an embodiment of the present disclosure. FIG. 11 shows a cross-section of the sensing electrodes and the first trace lines of the input sensor ISP disposed on the upper insulating layer TFL, which correspond to the active area AA-I. FIG. 11 schematically shows an arrangement relationship of the sensing electrodes TE1 and TE2 and the first trace line TL1 in cross-sections respectively taken along lines A-A', B-B', and C-C' shown in FIG. 6.

Referring to FIGS. 8A to 11, the first sensing patterns SP1 included in the first sensing electrode TE1 may include the first layer electrode SP1-1 corresponding to the first sensor conductive layer ICL1 and the second layer electrode SP1-2 corresponding to the second sensor conductive layer ICL2, and each of the first layer electrode SP1-1 and the second layer electrode SP1-2 may include the metal mesh pattern. A trapezoid shape shown in FIG. 11 may correspond to the cross-section of each of the metal mesh lines. The first layer electrode SP1-1 may be disposed on the first sensor insulating layer IIL1, and the second layer electrode SP1-2 may be disposed on the second sensor insulating layer IIL2. The third sensor insulating layer IIL3 may be disposed on the second layer electrode SP1-2 and may cover the second layer electrode SP1-2.

The first trace lines TL1 may be disposed in the active area AA-I and may replace the portion of the first layer electrode SP1-1 having the mesh shape. That is, the metal mesh pattern of the first layer electrode SP1-1 may be omitted in the area where the first trace lines TL1 are disposed, and the first trace lines TL1 may correspond to the omitted portion. According to embodiments, the first trace lines TL1 may be electrically connected to the second layer electrode SP1-2 disposed thereabove via the line contact LCT.

The second layer electrode SP1-2 may be electrically connected to the first layer electrode SP1-1. The second layer electrode SP1-2 may be electrically connected to the first layer electrode SP1-1 by the first electrode contacts ECT1 overlapping the active area AA-I.

The second layer electrode SP1-2 may overlap each of the first layer electrode SP1-1 and the first trace lines TL1. The second layer electrode SP1-2 may include the first portion PP1 overlapping the first layer electrode SP1-1 when viewed in the plane and the second portion PP2 overlapping the first trace lines TL1 when viewed in the plane.

The second sensing patterns SP2 included in the second sensing electrode TE2 may include the first layer sub-electrode SP2-1 corresponding to the first sensor conductive layer ICL1 and the second layer sub-electrode SP2-2 corresponding to the second sensor conductive layer ICL2, and each of the first layer sub-electrode SP2-1 and the second layer sub-electrode SP2-2 may include the metal mesh pattern. The first layer sub-electrode SP2-1 may be disposed on the first sensor insulating layer IIL1, and the second layer sub-electrode SP2-2 may be disposed on the second sensor insulating layer IIL2. The third sensor insulating layer IIL3 may be disposed on the second layer sub-electrode SP2-2 and may cover the second layer sub-electrode SP2-2.

The second layer sub-electrode SP2-2 may be electrically connected to the first layer sub-electrode SP2-1. The second layer sub-electrode SP2-2 may be electrically connected to the first layer sub-electrode SP2-1 by second electrode contacts ECT2 overlapping the active area AA-I. The second layer sub-electrode SP2-2 may be electrically connected to the second conductive pattern BP2. The second conductive pattern BP2 may be connected to the second layer sub-electrode SP2-2 via the contact holes TP-CH.

According to the input sensor included in the electronic device of embodiments of the present disclosure, since at least the portion of the first trace lines is disposed in the active area, the size of the peripheral area that provides a path through which the first trace lines pass may be reduced. Accordingly, the dead space of the display device may be reduced. In the case where the first trace line is disposed in the active area, a defect in which the first trace line disposed in the active area is viewable to a user may occur.

According to the input sensor of embodiments of the present disclosure, the first trace lines may be formed to have the same metal mesh structure as the sensing patterns, and the input sensor may be designed to allow the sensing patterns and the conductive patterns to be disposed in the active area where the first trace lines are not disposed. According to the input sensor of embodiments of the present disclosure, the sensing patterns may have the electrode layer structure with the two-layer structure corresponding to the first sensor conductive layer and the second sensor conductive layer, and the first trace lines may correspond to the first sensor conductive layer and may replace the sensing patterns corresponding to the first sensor conductive layer among the sensing patterns. Therefore, even though the first trace line having the metal mesh structure are disposed in the active area, the defect in which the first trace line is viewable to a user may be prevented since metal mesh sensing patterns are disposed adjacent to the first trace line.

In the case where the dummy electrode corresponding to the first sensor conductive layer is formed adjacent to the first trace line to increase the visibility, the parasitic capacitance may be induced in the dummy electrode, which is in an electrically floating state, and the sensing performance of the sensing electrodes may be deteriorated. For example, a mutual capacitance between the first sensing pattern and the second sensing pattern may significantly increase due to the parasitic capacitance generated in the dummy electrode corresponding to the first sensor conductive layer, and the sensing performance of the input sensor may be deteriorated. According to the input sensor of embodiments of the present disclosure, since the electrode patterns disposed adjacent to the first trace line are not dummy electrodes, and the sensing pattern with the two-layer structure disposed in both the first sensor conductive layer and the second sensor conductive layer and electrically connected thereto is utilized, the occurrence of the parasitic capacitance may be minimized or reduced. Accordingly, the increase of the mutual capacitance between the first sensing pattern and the second sensing pattern may be prevented or reduced, the sensing performance of the input sensor may be increased, and the reliability of the electronic device including the input sensor may be increased.

Figure 12A:
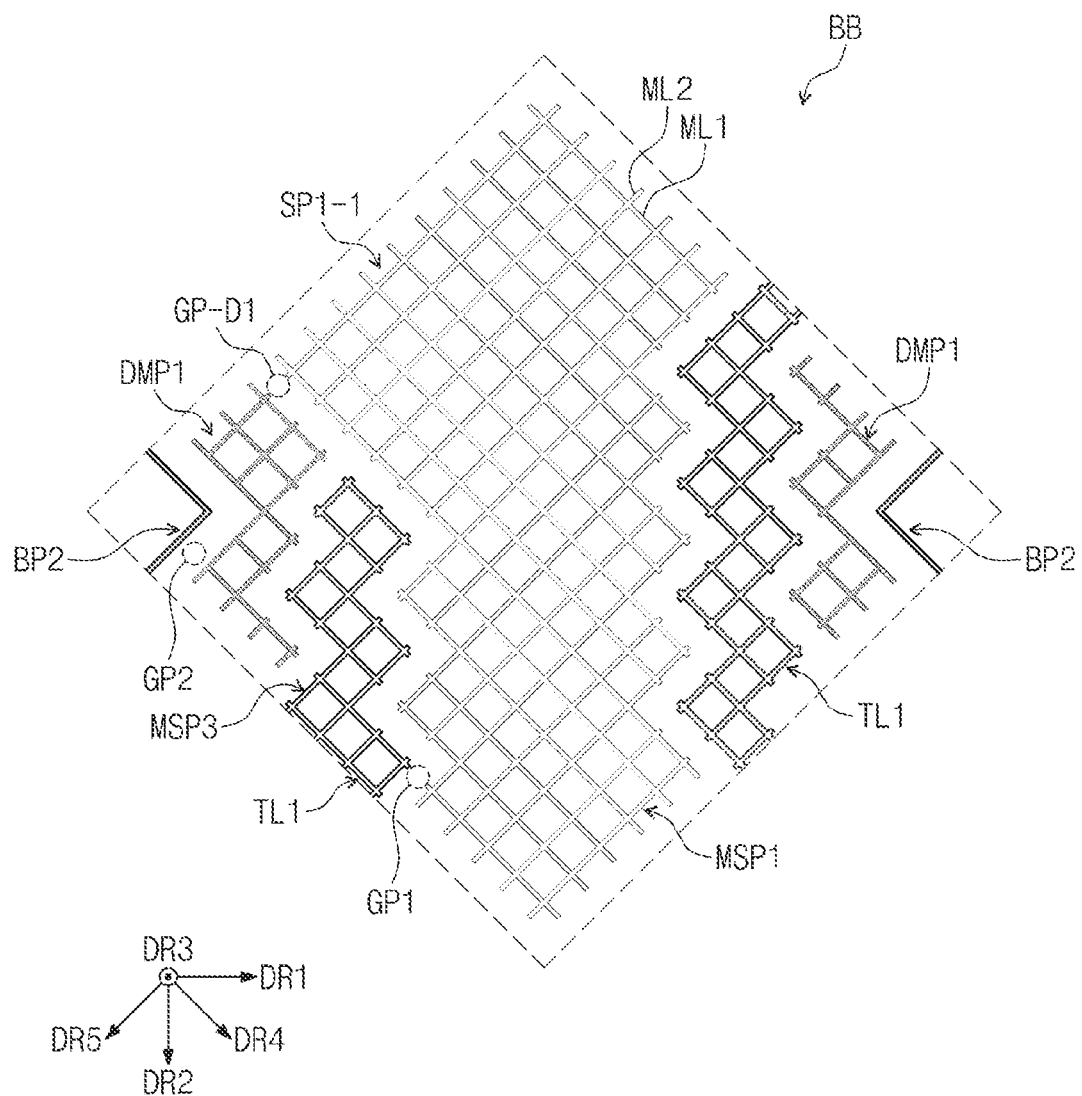
FIGS. 12A and 12B are enlarged plan views of portions of an input sensor according to an embodiment of the present disclosure.
Figure 12B:
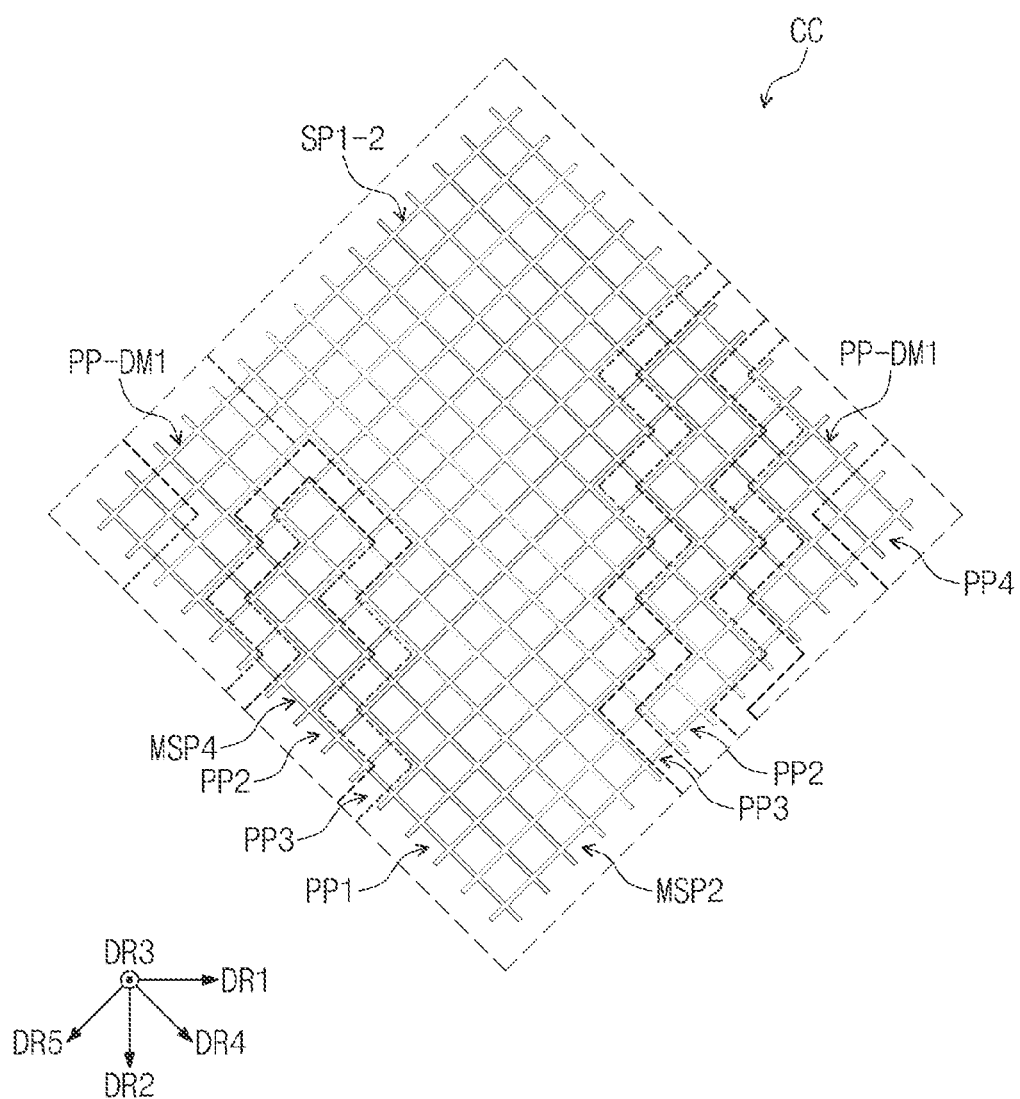
Figure 13:
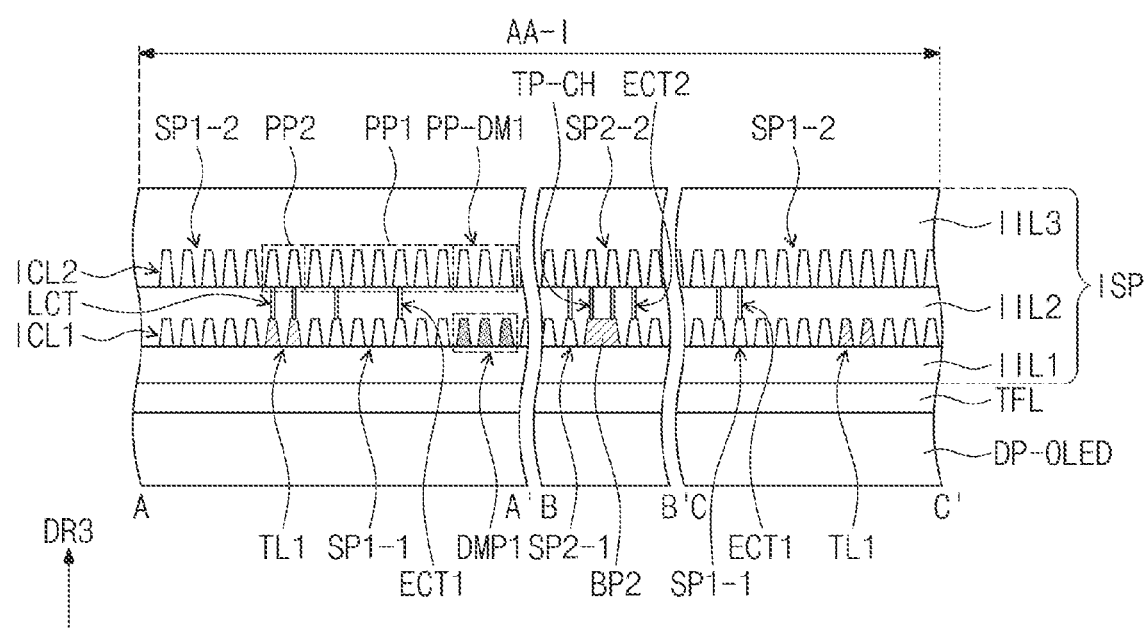
FIG. 13 is a cross-sectional view of a portion of an input sensor according to an embodiment of the present disclosure.

FIGS. 12A and 12B are enlarged plan views of portions of an input sensor according to an embodiment of the present disclosure. FIG. 13 is a cross-sectional view of a portion of an input sensor according to an embodiment of the present disclosure. FIG. 12A is an enlarged view of an area BB shown in FIG. 8A, and FIG. 12B is an enlarged view of an area CC shown in FIG. 8B. FIG. 13 schematically shows an arrangement relationship of sensing electrodes TE1 and TE2 (refer to FIG. 5) and a first trace line TL1 in cross-sections respectively taken along lines A-A', B-B', and C-C' shown FIG. 6. FIGS. 12A, 12B, and 13 show the input sensor different from the input sensor shown in FIGS. 9A, 9B, and 11. In FIGS. 12A, 12B, and 13, the same reference numerals denote the same elements in FIGS. 9A, 9B, and 11, and thus, detailed descriptions of the same elements will be omitted.

Referring to FIGS. 5, 12A, 12B, and 13, a first sensing electrode TE1 may further include a first dummy electrode DMP1 corresponding to a first sensor conductive layer ICL1. The first dummy electrode DMP1 may be electrically floated with respect to a first sensing pattern SP1. The first dummy electrode DMP1 may be disposed on a first sensor insulating layer IIL1, and the first dummy electrode DMP1 and a first layer electrode SP1-1 may be disposed on the same layer. The first dummy electrode DMP1 may be disposed adjacent to the first layer electrode SP1-1, and a predetermined gap GP-D1 defined by a cut portion of a metal mesh pattern may be defined between the first dummy electrode DMP1 and the first layer electrode SP1-1. The first dummy electrode DMP1 may be formed by forming the metal mesh pattern integrally with the first layer electrode SP1-1 and cutting a portion of the metal mesh pattern. According to embodiments, the first dummy electrode DMP1 does not receive separate electrical signals.

A second layer electrode SP1-2 may overlap the first dummy electrode DMP1. The second layer electrode SP1-2 may further include a first dummy portion PP-DM1 overlapping the first dummy electrode DMP1 when viewed in the plane. As shown in FIG. 12B, the first dummy portion PP-DM1 may be a portion that is provided integrally with another portion, e.g., a first portion PP1, of the second layer electrode SP1-2. However, the present disclosure is not limited thereto. For example, according to an embodiment, the first dummy portion PP-DM1 may be a portion disconnected from the another portion of the second layer electrode SP1-2. As an example, a cut portion may be defined between the first dummy portion PP-DM1 and the first portion PP1, and the first dummy portion PP-DM1 may correspond to the portion disconnected from the first portion PP1. The first dummy portion PP-DM1 may be a dummy portion that is electrically floated with respect to the another portion of the second layer electrode SP1-2. That is, the input sensor of embodiments of the present disclosure may include the first dummy portion PP-DM1 that is the dummy portion electrically floated with respect to the another portion of the second layer electrode SP1-2, and the first dummy electrode DMP1 may be disposed in the first sensor conductive layer ICL1 to correspond to the first dummy portion PP-DM1.

Figure 14A:
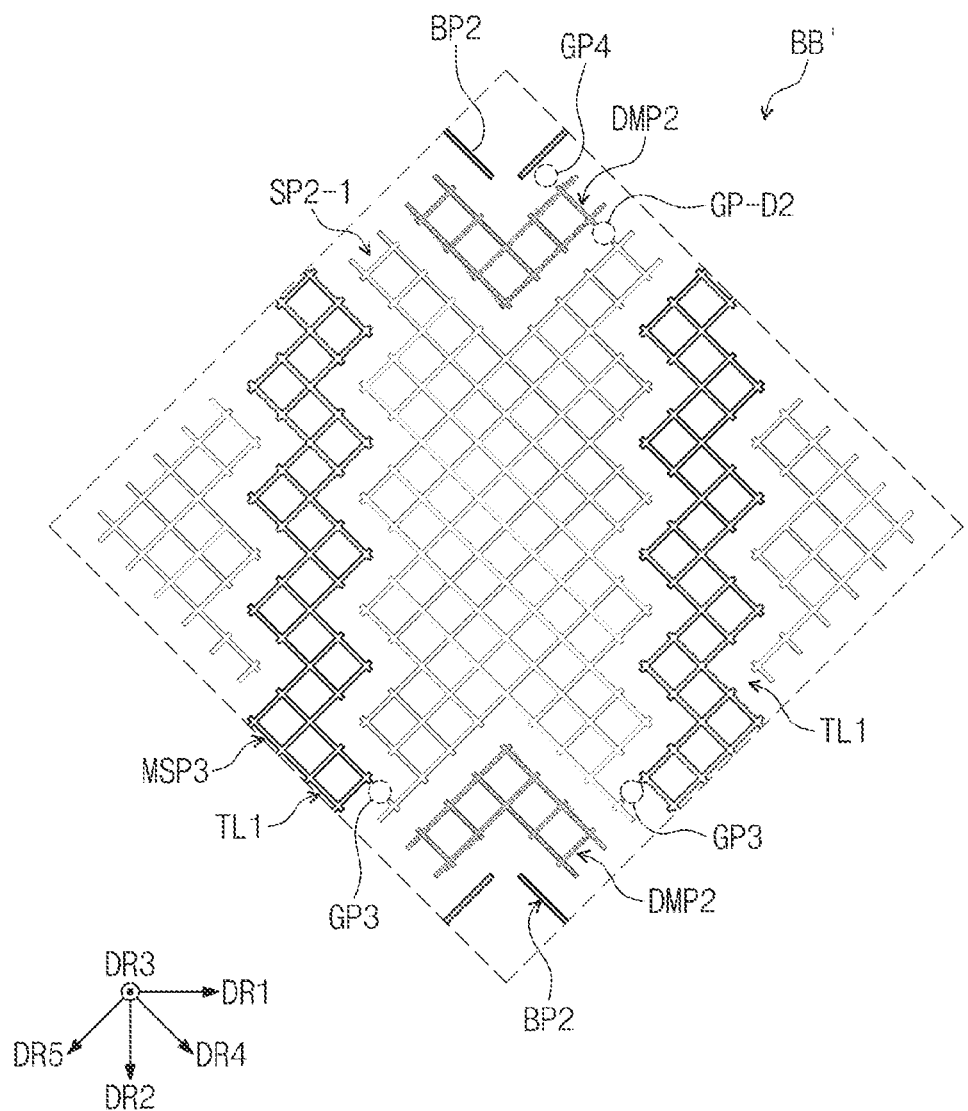
FIGS. 14A and 14B are enlarged plan views of portions of an input sensor according to an embodiment of the present disclosure.
Figure 14B:
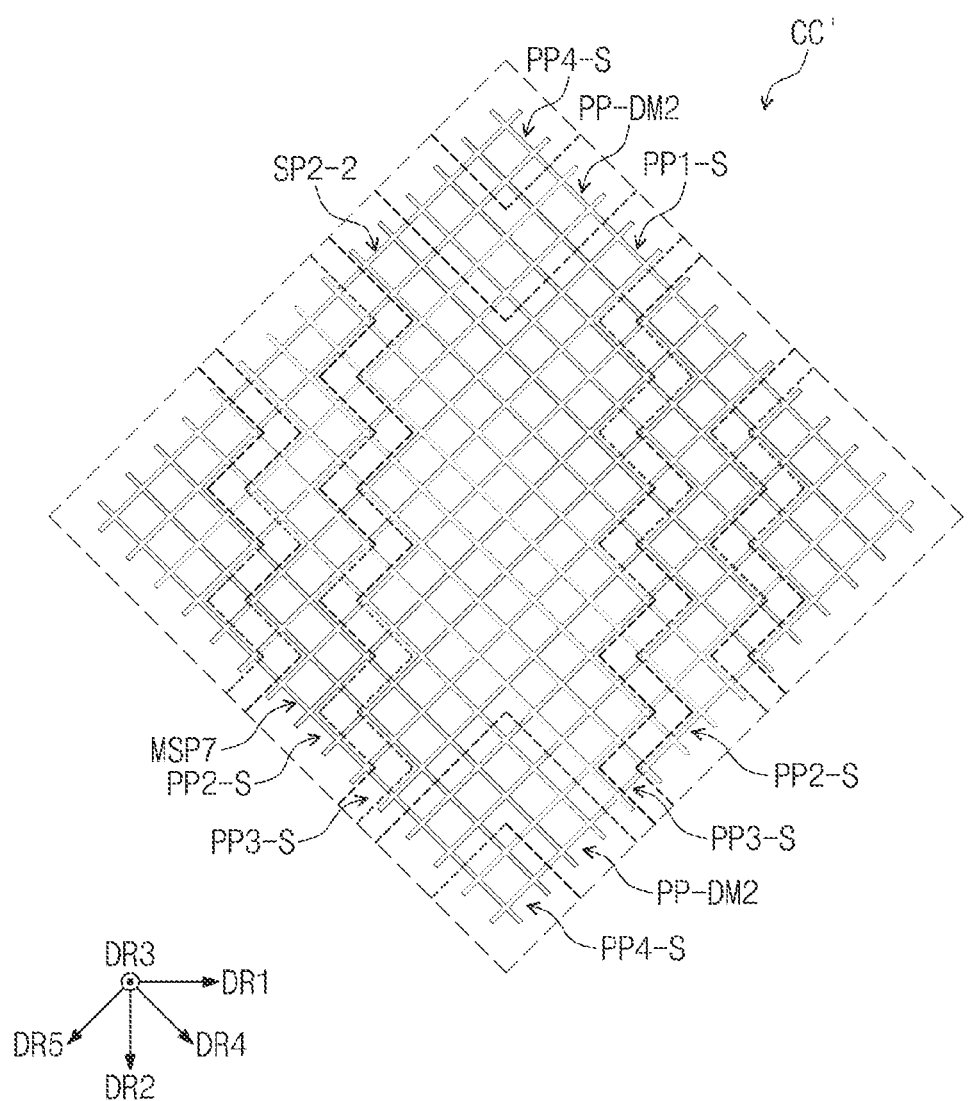
Figure 15:
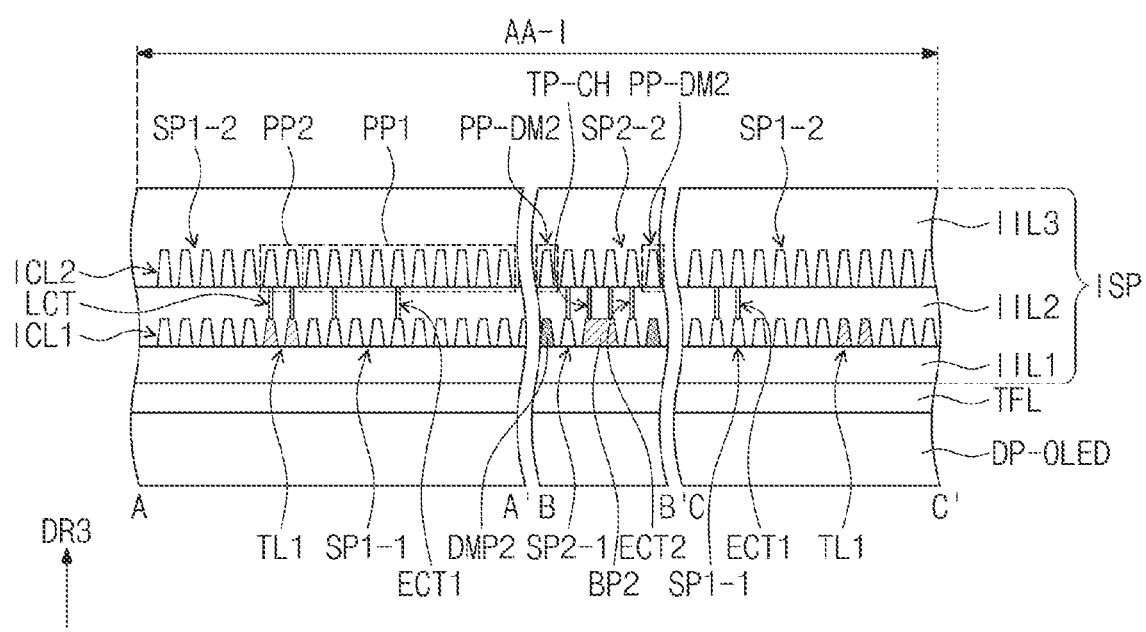
FIG. 15 is a cross-sectional view of a portion of an input sensor according to an embodiment of the present disclosure.

FIGS. 14A and 14B are enlarged plan views of portions of an input sensor according to an embodiment of the present disclosure, and FIG. 15 is a cross-sectional view of a portion of an input sensor according to an embodiment of the present disclosure. FIG. 14A is an enlarged view of an area BB' shown in FIG. 8A, and FIG. 14B is an enlarged view of an area CC' shown in FIG. 8B. FIG. 15 schematically shows an arrangement relationship of sensing electrodes TE1 and TE2 (refer to FIG. 5) and a first trace line TL1 in cross-sections respectively taken along lines A-A', B-B', and C-C' shown FIG. 6. FIGS. 14A, 14B, and 15 show the input sensor different from the input sensor shown in FIGS. 10A, 10B, and 11. In FIGS. 14A, 14B, and 15, the same reference numerals denote the same elements in FIGS. 10A, 10B, and 11, and thus, detailed descriptions of the same elements will be omitted.

Referring to FIGS. 5, 14A, 14B, and 15, a second sensing electrode TE2 may further include a second dummy electrode DMP2 corresponding to a first sensor conductive layer ICL1. The second dummy electrode DMP2 may be electrically floated with respect to a second sensing pattern SP2. The second dummy electrode DMP2 may be disposed on a first sensor insulating layer IIL1, and the second dummy electrode DMP2 and a first layer sub-electrode SP2-1 may be disposed on the same layer. The second dummy electrode DMP2 may be disposed adjacent to the first layer sub-electrode SP2-1, and a predetermined gap GP-D2 corresponding to a cut portion at which a metal mesh pattern is disconnected may be defined between the second dummy electrode DMP2 and the first layer sub-electrode SP2-1. The second dummy electrode DMP2 may be formed by forming a metal mesh pattern integrally with the first layer sub-electrode SP2-1 and cutting a portion of the metal mesh pattern. According to embodiments, the second dummy electrode DMP2 does not receive separate electrical signals.

A second layer sub-electrode SP2-2 may overlap the second dummy electrode DMP2. The second layer sub-electrode SP2-2 may further include a second dummy portion PP-DM2 overlapping the second dummy electrode DMP2 when viewed in the plane. As shown in FIG. 14B, the second dummy portion PP-DM2 may be a portion that is provided integrally with another portion, e.g., a first sub-portion PP1-S of the second layer sub-electrode SP2-2. However, the present disclosure is not limited thereto. For example, according to an embodiment, the second dummy portion PP-DM2 may be a portion disconnected from the another portion of the second layer sub-electrode SP2-2. As an example, a cut portion may be defined between the second dummy portion PP-DM2 and the first sub-portion PP1-S, and the second dummy portion PP-DM2 may correspond to the portion disconnected from the first sub-portion PP1-S. The second dummy portion PP-DM2 may be a dummy portion that is electrically floated with respect to the another portion of the second layer sub-electrode SP2-2. That is, the input sensor of embodiments of the present disclosure may include the second dummy portion PP-DM2 that is the dummy portion electrically floated with respect to the another portion of the second layer sub-electrode SP2-2, and the second dummy electrode DMP2 may be disposed in the first sensor conductive layer ICL1 to correspond to the second dummy portion PP-DM2.

Figure 16:
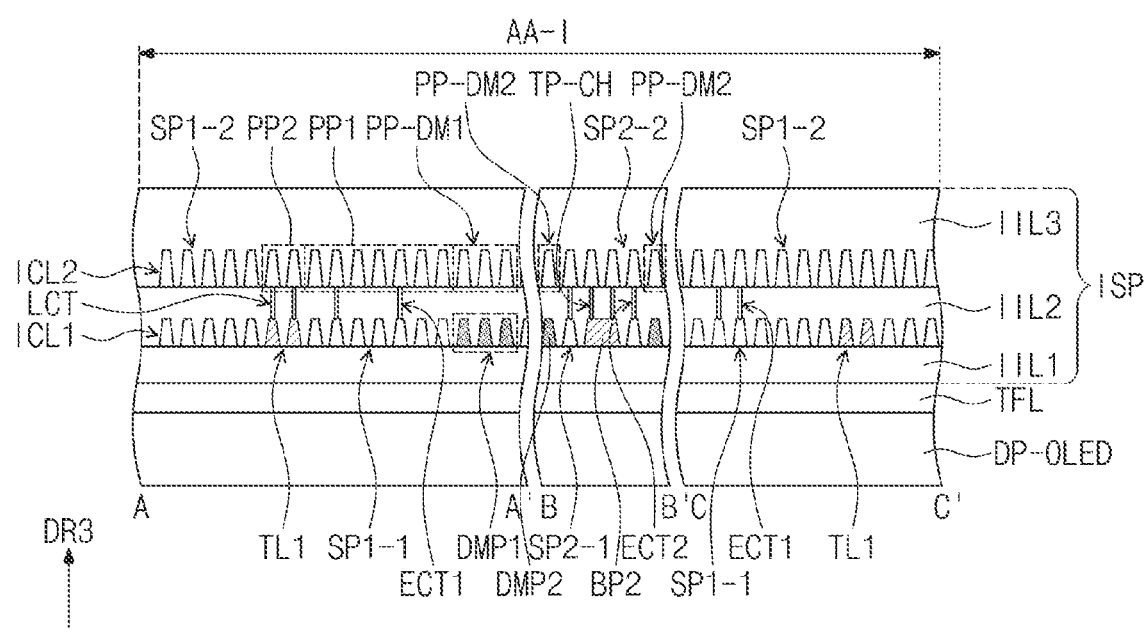
FIG. 16 is a cross-sectional view of a portion of an input sensor according to an embodiment of the present disclosure.

FIG. 16 is a cross-sectional view of a portion of an input sensor according to an embodiment of the present disclosure. FIG. 16 schematically shows an arrangement relationship of sensing electrodes TE1 and TE2 (refer to FIG. 5) and a first trace line TL1 in cross-sections respectively taken along lines A-A', B-B', and C-C' shown FIG. 6.

Referring to FIGS. 5, 12A, 12B, 14A, 14B, and 16, a first sensing electrode TE1 may further include a first dummy electrode DMP1 corresponding to a first sensor conductive layer ICL1, and a second sensing electrode TE2 may further include a second dummy electrode DMP2 corresponding to a first sensor conductive layer ICL1.

A second layer electrode SP1-2 may be overlap the first dummy electrode DMP1. The second layer electrode SP1-2 may further include a first dummy portion PP-DM1 overlapping the first dummy electrode DMP1 when viewed in the plane. As shown in FIG. 12B, the first dummy portion PP-DM1 may be a portion that is provided integrally with another portion, e.g., a first portion PP1 of the second layer electrode SP1-2. However, the present disclosure is not limited thereto. For example, according to an embodiment, the first dummy portion PP-DM1 may be a portion disconnected from the another portion of the second layer electrode SP1-2. As an example, a cut portion may be defined between the first dummy portion PP-DM1 and the first portion PP1, and the first dummy portion PP-DM1 may correspond to the disconnected portion from the first portion PP1. The first dummy portion PP-DM1 may correspond to a dummy portion electrically floated with respect to the another portion of the second layer electrode SP1-2. That is, the input sensor may include the first dummy portion PP-DM1 that is the dummy portion electrically floated with respect to the another portion in the second layer electrode SP1-2, and the first dummy electrode DMP1 may be disposed in the first sensor conductive layer ICL1 to correspond to the first dummy portion PP-DM1.

A second layer sub-electrode SP2-2 may overlap the second dummy electrode DMP2. The second layer sub-electrode SP2-2 may further include a second dummy portion PP-DM2 overlapping the second dummy electrode DMP2 when viewed in the plane. As shown in FIG. 14B, the second dummy portion PP-DM2 may be a portion having a shape provided integrally with another portion of the second layer sub-electrode SP2-2, for example, a first sub-portion PP1-S. However, the present disclosure is not limited thereto. For example, according to an embodiment, the second dummy portion PP-DM2 may be a portion disconnected from the another portion of the second layer sub-electrode SP2-2. As an example, a cut portion may be defined between the second dummy portion PP-DM2 and the first sub-portion PP1-S, and the second dummy portion PP-DM2 may correspond to the disconnected portion from the first sub-portion PP1-S. The second dummy portion PP-DM2 may correspond to a dummy portion that is electrically floated with respect to the another portion of the second layer sub-electrode SP2-2. That is, the input sensor may include the second dummy portion PP-DM2 that is the dummy portion electrically floated with respect to the another portion in the second layer sub-electrode SP2-2, and the second dummy electrode DMP2 may be disposed in the first sensor conductive layer ICL1 to correspond to the second dummy portion PP-DM2.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. An input sensor, comprising:
   a first sensor insulating layer comprising an active area and a peripheral area disposed adjacent to the active area;
   a second sensor insulating layer disposed on the first sensor insulating layer;
   a plurality of first sensing electrodes disposed on the first sensor insulating layer, overlapping the active area, wherein each of the plurality of first sensing electrodes comprises a plurality of first sensing patterns arranged along a first direction;
   a second sensing electrode disposed on the first sensor insulating layer, overlapping the active area, and comprising a plurality of second sensing patterns arranged along a second direction crossing the first direction; and
   a first trace line connected to one of the first sensing patterns, wherein at least a portion of the first trace line overlaps the active area and is disposed on the first sensor insulating layer,
   wherein each of the first sensing patterns comprises:
   a first layer electrode disposed on the first sensor insulating layer; and
   a second layer electrode disposed on the second sensor insulating layer and electrically connected to the first layer electrode, wherein the second layer electrode comprises:
   a first portion overlapping the first layer electrode when viewed in a plane; and
   a second portion overlapping the first trace line when viewed in the plane,
   wherein the plurality of first sensing electrodes are arranged along the second direction,
   wherein, in a plan view, the at least a portion of the first trace line extends along the second direction in the active area and overlaps at least two of the plurality of first sensing electrodes.

2. The input sensor of claim 1, wherein each of the plurality of first sensing electrodes further comprises a first dummy electrode disposed on the first sensor insulating layer and electrically floated with respect to the first sensing patterns, and the second layer electrode further comprises a first dummy portion overlapping the first dummy electrode when viewed in the plane.

3. The input sensor of claim 1, wherein each of the first sensing patterns and the first trace line comprise a plurality of mesh lines, and each of the mesh lines comprises:
   a first mesh line extending in a first diagonal direction between the first direction and the second direction; and
   a second mesh line extending from the first mesh line to a second diagonal direction crossing the first diagonal direction.

4. The input sensor of claim 3, wherein the first layer electrode comprises a first mesh pattern, the first portion of the second layer electrode comprises a second mesh pattern, and at least a portion of the second mesh pattern overlaps the first mesh pattern when viewed in the plane.

5. The input sensor of claim 3, wherein the first trace line comprises a first mesh pattern, the second portion of the second layer electrode comprises a second mesh pattern, and at least a portion of the second mesh pattern overlaps the first mesh pattern when viewed in the plane.

6. The input sensor of claim 1, wherein a first gap is disposed between the first layer electrode and the first trace line, and the second layer electrode further comprises a third portion overlapping the first gap when viewed in the plane.

7. The input sensor of claim 6, wherein the first portion, the second portion, and the third portion are provided integrally with each other.

8. The input sensor of claim 1, wherein the second layer electrode is connected to the first trace line via at least one line contact, and the at least one line contact overlaps the active area.

9. The input sensor of claim 1, wherein the second layer electrode is connected to the first layer electrode via at least one first electrode contact, and the at least one first electrode contact overlaps the active area.

10. The input sensor of claim 1, wherein the second sensing electrode further comprises a plurality of bridge patterns that connects the second sensing patterns, and the bridge patterns are disposed on the first sensor insulating layer.

11. The input sensor of claim 1, further comprising:
    a second trace line connected to one of the second sensing patterns and overlapping the peripheral area.

12. The input sensor of claim 1, wherein each of the plurality of first sensing electrodes further comprises a plurality of extension patterns that connects the first sensing patterns, and each of the extension patterns is disposed on the second sensor insulating layer and provided integrally with the second layer electrode.

13. The input sensor of claim 1, wherein each of the second sensing patterns comprises:
    a first layer sub-electrode disposed on the first sensor insulating layer; and
    a second layer sub-electrode disposed on the second sensor insulating layer and electrically connected to the first layer sub-electrode.

14. The input sensor of claim 13, wherein the second sensing electrode further comprises a dummy electrode disposed on the first sensor insulating layer and electrically floated with respect to the second sensing electrode, and the second layer sub-electrode further comprises a dummy portion overlapping the dummy electrode.

15. The input sensor of claim 13, wherein a portion of the first trace line overlaps the second layer sub-electrode when viewed in the plane, and the second layer sub-electrode comprises:
    a first sub-portion overlapping the first layer sub-electrode when viewed in the plane; and
    a second sub-portion overlapping the first trace line when viewed in the plane.

16. The input sensor of claim 13, wherein the second layer sub-electrode is connected to the first layer sub-electrode via at least one electrode contact, and the at least one electrode contact overlaps the active area.

\* \* \* \* \*